United States Patent
Sakai et al.

[11] Patent Number: 5,925,086
[45] Date of Patent: Jul. 20, 1999

[54] VEHICULAR AUTOMATIC TRANSMISSION AND APPARATUS AND METHOD FOR CONTROLLING GEAR SHIFT THEREOF

[75] Inventors: Hiromasa Sakai, Kanagawa; Motoharu Nishio, Yokohama; Takashi Murasugi, Shizuoka, all of Japan

[73] Assignee: Nissan Motor Co., Ltd, Yokohama, Japan

[21] Appl. No.: 08/908,713

[22] Filed: Aug. 12, 1997

[30] Foreign Application Priority Data

Aug. 13, 1996 [JP] Japan .................................. 8-213732
Aug. 30, 1996 [JP] Japan .................................. 8-230705

[51] Int. Cl.$^6$ .................................................. F16H 61/08
[52] U.S. Cl. ............................ 701/66; 475/120; 475/129; 477/154
[58] Field of Search ....................... 701/66, 51; 477/154, 477/155, 168, 171, 63, 65, 143; 475/120, 129, 128, 127, 131

[56] References Cited

U.S. PATENT DOCUMENTS

| 4,730,519 | 3/1988 | Nakamura et al. | 701/66 |
| 5,478,288 | 12/1995 | Sakakibara et al. | 475/129 |
| 5,611,752 | 3/1997 | Kamada et al. | 477/98 |
| 5,733,220 | 3/1998 | Iizuka | 477/116 |
| 5,839,988 | 11/1998 | Marusue et al. | 477/130 |
| 5,865,708 | 2/1999 | Nishio et al. | 477/155 |

FOREIGN PATENT DOCUMENTS

| 4-175576 | 6/1992 | Japan . |
| 5-157168 | 6/1993 | Japan . |

*Primary Examiner*—Jacques H. Louis-Jacques
*Attorney, Agent, or Firm*—Foley & Lardner

[57] ABSTRACT

In apparatus and method for controlling a gear shift of a vehicular automatic transmission, the automatic transmission the automatic transmission having a releasing frictional element, a clutching frictional element, and a source of a releasing working liquid pressure to be applied to the releasing frictional element and a clutching working liquid pressure to be applied to the clutching frictional element, a gear shift in the automatic transmission being carried out by a shift from the releasing frictional element to the clutching frictional element, during a time duration from a time at which a gear shift instruction is outputted to a time at which a torque phase is started, the releasing working liquid pressure is reduced and reached without undershooting to a first predetermined working liquid pressure value under which the releasing frictional element is in a state immediately before an occurrence of a slip and the clutching working liquid pressure is set at least a second predetermined working liquid pressure value under which the clutching element is in a state immediately before a clutching.

49 Claims, 17 Drawing Sheets

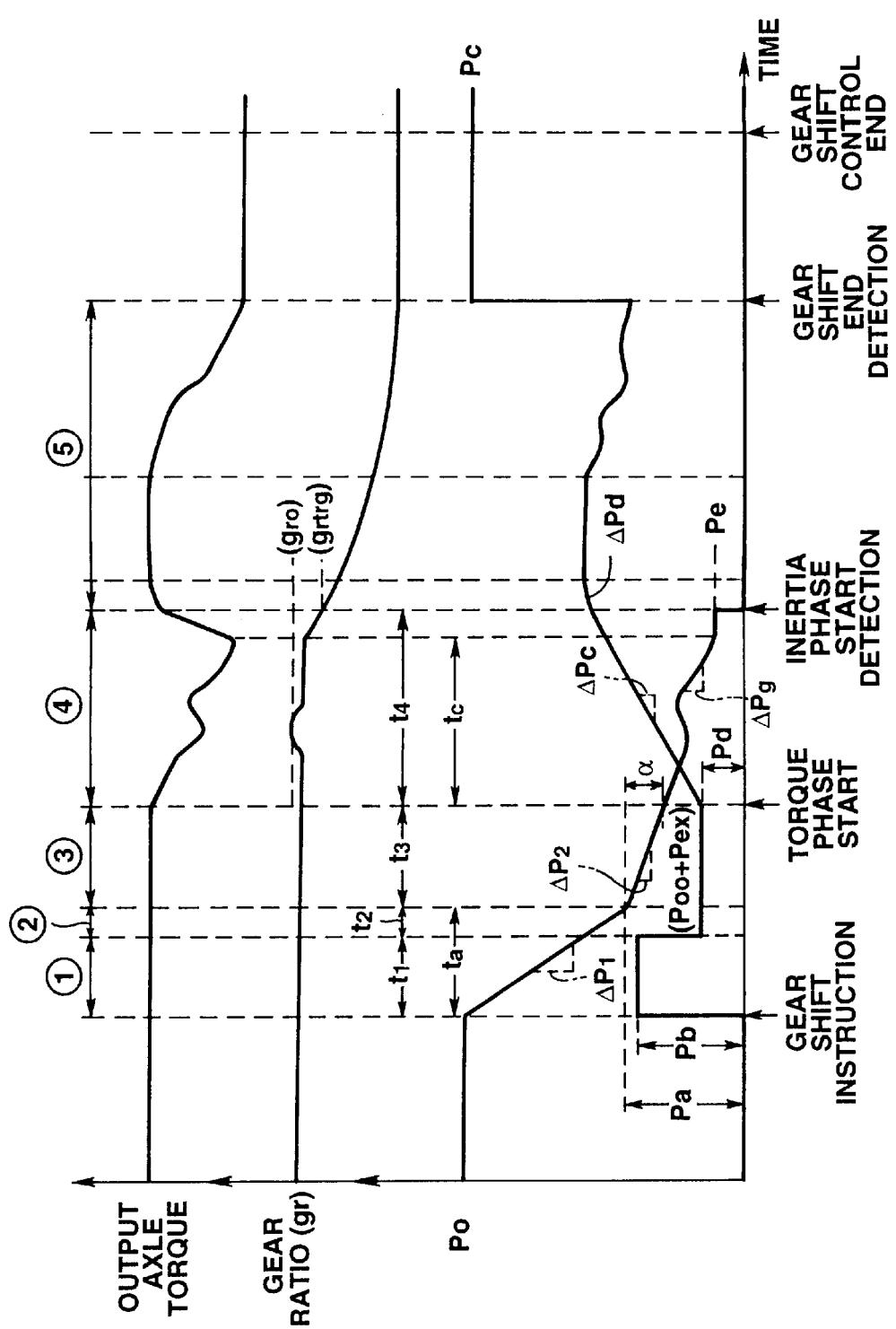

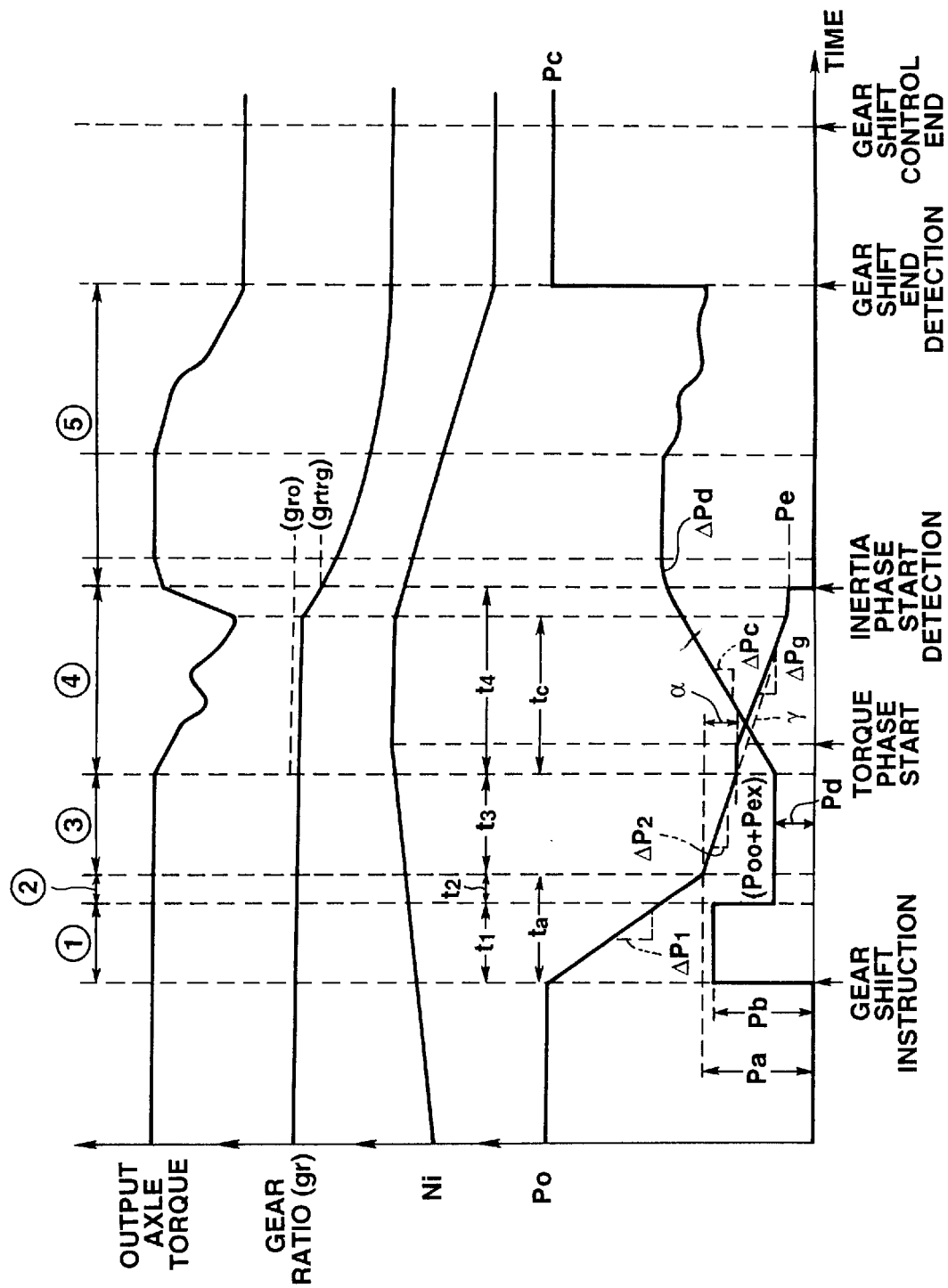

VEHICULAR AUTOMATIC TRANSMISSION AND APPARATUS AND METHOD FOR CONTROLLING GEAR SHIFT THEREOF

The contents of Patent Applications No. Heisei 8-213732 and Heisei 8-230705, with the filing dates of Aug. 13, 1996 and Aug. 30, 1996 in Japan, are herein incorporated by reference.

BACKGROUND OF THE INVENTION

The present invention relates to a vehicular automatic transmission and apparatus and method for controlling a gear shift of the vehicular automatic (power) transmission, especially, for controlling the gear shift of the vehicular automatic transmission so as to advance a suitable gear shift operation during a torque phase with no temporary neutral state.

An automatic transmission includes gear shifting frictional elements having a plurality of clutches and brakes. The gear shifting frictional elements are selectively and hydraulically (liquid pressure) operated (clutched) so as to determine a power transmission route (gear shift range) in a gear transmission system.

In addition, a switching between the operated frictional elements permits a gear shift from the present gear shift range to another gear shift range.

It is noted that, when the gear shift occurs, one of the frictional elements which is to be switched from a clutched (engaged) state to a released (de-clutched or disengaged) state is, hereinafter, referred to as a releasing (side) frictional element, its working liquid pressure is referred to as a releasing working liquid pressure, another of the frictional elements which is to be switched from the released state to the clutched state is referred to as a clutching (side) frictional element, and its working liquid pressure is referred to as a clutching working liquid pressure.

The automatic transmission is so constructed that the gear shift carried out by, so-called, an interchange (or shift) of the frictional elements such that while a certain frictional element is released due to a reduction in the working liquid pressure, the other frictional element is clutched due to an increase (rise up) of the working liquid pressure is present.

Unless both of the reduction in the working liquid pressure of the releasing frictional element(namely, the releasing working liquid pressure) and the increase in the working liquid pressure of the clutching frictional element (namely, the clutching working liquid pressure) are advanced with a suitable correlation in a case where the interchange of the frictional elements is carried out during the occurrence of the gear shift, a gear shift quality would be worsened such that a large torque absorption during a torque phase would be developed, a temporary engine idling with an accelerator pedal depressed at a preceding stage to the automatic transmission would be developed, and an elongated gear shift time duration would occur.

A Japanese Patent Application First Publication No. Heisei 4-175576 published on Jun. 23, 1992 exemplifies a first previously proposed gear shift control apparatus for an automatic transmission.

In the first previously proposed gear shift controlling apparatus for the automatic transmission, the releasing working liquid pressure is once below a required clutching capacity for the releasing frictional element so that the releasing frictional element is slipped, thus a slight engine idling with the accelerator pedal depressed, and a feedback control of the releasing working liquid pressure is carried out so that a variable corresponding to the engine idling described above becomes coincident with a target variable. However, since the feedback control of the releasing working liquid pressure such that the variable corresponding to the engine idling described above becomes coincident with the target variable means such a control as to make the associated engine to be idle with the accelerator pedal depressed, it is difficult to expect a sufficient improvement in the gear shift quality.

In addition, since, in the first previously proposed control apparatus, a system high responsive characteristic including a detection response of the engine idling and an operation response of an actuator is indispensable for the feedback control during a short torque phase.

Furthermore, it is difficult to put the above-described feedback control into practice with a practical difficulty in a high responsive characteristic to meet a demand as described above or with a high cost required in mind.

Next, a Japanese Patent Application First Publication No. Heisei 5-157168 published on Jun. 22, 1993 exemplifies a second previously proposed gear shift control apparatus for the automatic transmission.

In the second previously proposed gear shift controlling apparatus, a command to reduce the releasing working liquid pressure and a command to increase the clutching working cylinder are outputted in a manner such that a constant inverse proportional relationship is established between both liquid pressures so that the reduction in the releasing working liquid pressure is advanced in the constant inverse relationship with respect to the increase in the clutching working liquid pressure.

In the previously proposed gear shift controlling apparatus, a command to reduce the releasing working liquid pressure and a command to increase the clutching working cylinder are outputted in a manner such that a constant inverse proportional relationship is established between both liquid pressures so that the reduction in the releasing working liquid pressure is advanced in the constant inverse proportional relationship with respect to the clutching working liquid pressure.

However, since, when the clutching frictional element is clutched, the clutching of the frictional element is started after a large quantity of the working liquid is supplied to a working piston, the start of clutching of the clutching frictional element cannot avoid tending to be delayed with respect to the command issued to rise the clutching working liquid pressure.

Whereas, the reduction in the releasing working liquid pressure has not a noticeable delay with respect to a command to reduce the releasing working liquid pressure. The start of releasing of the releasing frictional element may be almost instant to the command to reduce the releasing working liquid pressure.

When the gear shift carried out by the interchange between the frictional elements such that the releasing frictional element is released (declutched) while the clutching frictional element is clutched, there is a tendency such that the release of the releasing frictional element would be started in prior to the start of the clutching of the clutching frictional element only if the command to reduce the releasing working liquid pressure and to the command to increase (rise) the clutching working liquid pressure are outputted with the constant inverse proportional relationship.

In this case, when the release of the releasing frictional element is carried out a torque charging of the releasing frictional element gives zero, the clutching of the clutching frictional element is not yet started.

Hence, the torque charging of the clutching frictional element is not yet carried out. As a result of this, the engine associated with the automatic transmission becomes idle with the accelerator pedal depressed.

The engine idling described above develops the torque absorption during the torque phase and the gear shift quality of the automatic transmission is remarkably reduced.

Upon the detection of the engine idling described above, the clutching of the clutching frictional element is started.

This raises the same problem as described in the first previously proposed gear shift controlling apparatus for the automatic transmission.

It is noted that with the delay in the start of clutching of the clutching frictional element with respect to the command to rise the clutching working liquid pressure taken into a previous consideration, the command to reduce the releasing working liquid pressure may be delayed with respect to the command to rise the clutching working liquid pressure. However, the delay in the start of the clutching of the clutching frictional element has an inherent difference between each automatic transmission.

In addition, since a continuous change in the delay in the start of clutching occurs due to an aging effect and/or an environmental change, an elimination of the engine idling described above cannot be assured.

SUMMARY OF THE INVENTION

It is therefore an object of the present invention to provide a vehicular automatic transmission and a gear shift controlling apparatus and method for the vehicular automatic transmission which can always achieve a sufficient improvement in a gear shift quality, with no temporary engine idling (a temporary neutral state in the automatic transmission), an engine accelerator being operated to demand a torque developed any more.

The above-described object can be achieved by providing a vehicular automatic transmission, comprising: a) a releasing frictional element; a clutching frictional element; a source of a releasing working liquid pressure to be applied to the releasing frictional element and a clutching working liquid pressure to be applied to the clutching frictional element; and d) a gear shift controlling apparatus, having a timer for starting a measurement of a time duration from an instantaneous time at which a gear shift instruction is outputted to make a gear shift from the releasing frictional element to the clutching frictional element such that, while the releasing frictional element is released due to a reduction in pressure of the releasing working liquid pressure, the clutching frictional element is clutched due to a rise in pressure of the clutching working liquid pressure to an instantaneous time at which a torque phase is started, for outputting a releasing working liquid pressure command value so that the releasing working liquid pressure is reduced and reached to a first predetermined working liquid pressure value under which the releasing frictional element is in a state immediately before an occurrence of a slip without an overshooting such that the releasing working liquid pressure is reduced below the first predetermined working liquid pressure value so that the slip occurs on the releasing frictional element during the measured time duration and for outputting a clutching working liquid pressure command value so that the clutching working liquid pressure becomes at least a second predetermined working liquid pressure value under which the clutching element is in a state immediately before a clutching upon an end of an elapse of the time duration.

The above-described object can also be achieved by providing an apparatus for controlling a gear shift of a vehicular automatic transmission associated with an engine, the automatic transmission having a releasing frictional element, a clutching frictional element, and a source of a releasing working liquid pressure to be applied to the releasing frictional element and a clutching working liquid pressure to be applied to the clutching frictional element, a gear shift in the automatic transmission being carried out by a shift from the releasing frictional element to the clutching frictional element such that while the releasing frictional element is released due to a reduction in pressure of the releasing working liquid pressure, the clutching frictional element is clutched due to a rise in pressure of the clutching working liquid pressure, the gear shift controlling apparatus comprising: a) an engine driving condition detector for detecting an engine operating condition, the engine driving condition detector having an engine revolution speed sensor for detecting an engine revolution speed; b) an automatic transmission input axle revolution speed sensor for detecting a revolution speed of an input axle of the automatic transmission; c) an automatic transmission output axle revolution speed sensor for detecting a revolution speed of an output axle of the automatic transmission; and d) a controller for determining a suitable gear shift range on the basis of the engine operating condition and the automatic transmission output axle revolution speed, for comparing the suitable gear shift range with a presently selected gear shift range, for outputting a gear shift instruction to the automatic transmission to carry out the gear shift when the suitable gear shift range is incongruent with the presently selected gear shift range, for determining an input torque of the automatic transmission on the basis of the revolution speeds of the input and output axles of the automatic transmission, for determining a first predetermined releasing working liquid pressure value under which the releasing frictional element is in a state immediately before an occurrence of a slip thereon on the basis of the input torque of the automatic transmission, for determining and outputting a rate of the reduction in pressure of a releasing working liquid pressure command value to the automatic transmission so that the releasing working liquid pressure is reduced and reached to the first predetermined releasing working liquid pressure value without an undershooting such that the releasing working liquid pressure is reduced below the first predetermined releasing working liquid pressure value so that the slip occurs on the releasing frictional element during a time duration from an instantaneous time at which the gear shift instruction is outputted to an instantaneous time at which a torque phase is started, and for determining and outputting a clutching working liquid pressure command value to the automatic transmission so that the clutching working liquid pressure becomes at least a second predetermined clutching working liquid pressure value under which the clutching frictional element is in a state immediately before a clutching upon an end of an elapse of the time duration.

The above-described object can also be achieved by providing an apparatus for controlling a gear shift of a vehicular automatic transmission associated with an engine, the automatic transmission having a releasing frictional element, a clutching frictional element, and a source of a releasing working liquid pressure to be applied to the releasing frictional element and a clutching working liquid pressure to be applied to the clutching frictional element, a gear shift in the automatic transmission being carried out by a shift from the releasing frictional element to the clutching frictional element such that while the releasing frictional element is released due to a reduction in pressure of the releasing working liquid pressure, the clutching frictional element is clutched due to a rise in pressure of the clutching working liquid pressure, the gear shift controlling apparatus comprising: a) engine driving condition detecting means for detecting an engine operating condition, the engine driving condition detecting means including engine revolution speed sensing means for detecting an engine revolution speed; b) automatic transmission input axle revolution speed detecting means for detecting a revolution speed of an input axle of the automatic transmission; c) automatic transmission output axle revolution speed detecting means for detecting a revolution speed of an output axle of the automatic transmission; d) first determining means for determining a suitable gear shift range on the basis of the engine operating condition and the automatic transmission output axle revolution speed; e)comparing means for comparing the suitable gear shift range with a presently selected gear shift range; f) first outputting means for outputting a gear shift instruction to the automatic transmission to carry out the gear shift when the suitable gear shift range is incongruent with the presently selected gear shift range; g) second determining means for determining an input torque of the automatic transmission on the basis of the revolution speeds of the input and output axles of the automatic transmission; h) third determining means for determining a first predetermined releasing working liquid pressure value under which the releasing frictional element is in a state immediately before an occurrence of a slip thereon on the basis of the input torque of the automatic transmission; i) fourth determining means for determining a rate of the reduction in pressure of a releasing working liquid pressure command value to the automatic transmission so that the releasing working liquid pressure is reduced and reached to the first predetermined releasing working liquid pressure value without an undershooting such that the releasing working liquid pressure is reduced below the first predetermined releasing working liquid pressure value so that the slip occurs on the releasing frictional element during a time duration from an instantaneous time at which the gear shift instruction is outputted to an instantaneous time at which a torque phase is started; j) fifth determining means for determining a clutching working liquid pressure command value to the clutching working liquid pressure so that the clutching working liquid pressure becomes at least a second predetermined clutching working liquid pressure value under which the clutching frictional element is in a state immediately before a clutching upon an end of an elapse of the time duration; and k) second outputting means for outputting the releasing working liquid pressure command value (Po) to the automatic transmission and outputting the clutching working liquid pressure command value (Pc) to the automatic transmission.

The above-described object can also be achieved by providing a method for controlling a gear shift of a vehicular automatic transmission associated with an engine, the automatic transmission having a releasing frictional element, a clutching frictional element, and a source of a releasing working liquid pressure to be applied to the releasing frictional element and a clutching working liquid pressure to be applied to the clutching frictional element, a gear shift in the automatic transmission being carried out by a shift from the releasing frictional element to the clutching frictional element such that while the releasing frictional element is released due to a reduction in pressure of the releasing working liquid pressure, the clutching frictional element is clutched due to a rise in pressure of the clutching working liquid pressure, the gear shift controlling method comprising the steps of: a) detecting an engine operating condition, the engine driving condition including detecting an engine revolution speed; b) detecting a revolution speed of an input axle of the automatic transmission; c) detecting a revolution speed of an output axle of the automatic transmission; d) determining a suitable gear shift range on the basis of the engine operating condition and the automatic transmission output axle revolution speed; e) comparing the suitable gear shift range with a presently selected gear shift range; f) outputting a gear shift instruction to the automatic transmission to carry out the gear shift when the suitable gear shift range is incongruent with the presently selected gear shift range; g) determining an input torque of the automatic transmission on the basis of the revolution speeds of the input and output axles of the automatic transmission; h) determining a first predetermined releasing working liquid pressure value under which the releasing frictional element is in a state immediately before an occurrence of a slip thereon on the basis of the input torque of the automatic transmission; i) determining a rate of the reduction in pressure of a releasing working liquid pressure command value to the automatic transmission so that the releasing working liquid pressure is reduced and reached to the first predetermined releasing working liquid pressure value without an undershooting such that the releasing working liquid pressure is reduced below the first predetermined releasing working liquid pressure value so that the slip occurs on the releasing frictional element during a time duration from an instantaneous time at which the gear shift instruction is outputted to an instantaneous time at which a torque phase is started; j) determining a clutching working liquid pressure command value to the automatic transmission so that the clutching working liquid pressure becomes at least a second predetermined clutching working liquid pressure value under which the clutching frictional element is in a state immediately before a clutching upon an end of an elapse of the time duration; k)outputting the releasing working liquid pressure command value to the automatic transmission; and l) outputting the clutching working liquid pressure command value to the automatic transmission.

BRIEF DESCRIPTION OF THE DRAWINGS:

FIGS. 9A, 9B, and 9C are integrally an operational flowchart indicating time variations in a clutching working liquid pressure command value and a releasing working liquid pressure command value.

FIGS. 15A, 15B, 15C, and 15D are integrally a timing chart on the time variations of the clutching working liquid pressure and releasing working liquid pressure command values according to the gear shift control in the fifth embodiment.

BEST MODE FOR CARRYING OUT THE INVENTION:

Reference will, hereinafter, be made to the drawings in order to facilitate a better understanding of the present invention.

(First Embodiment)

Figure 1A:
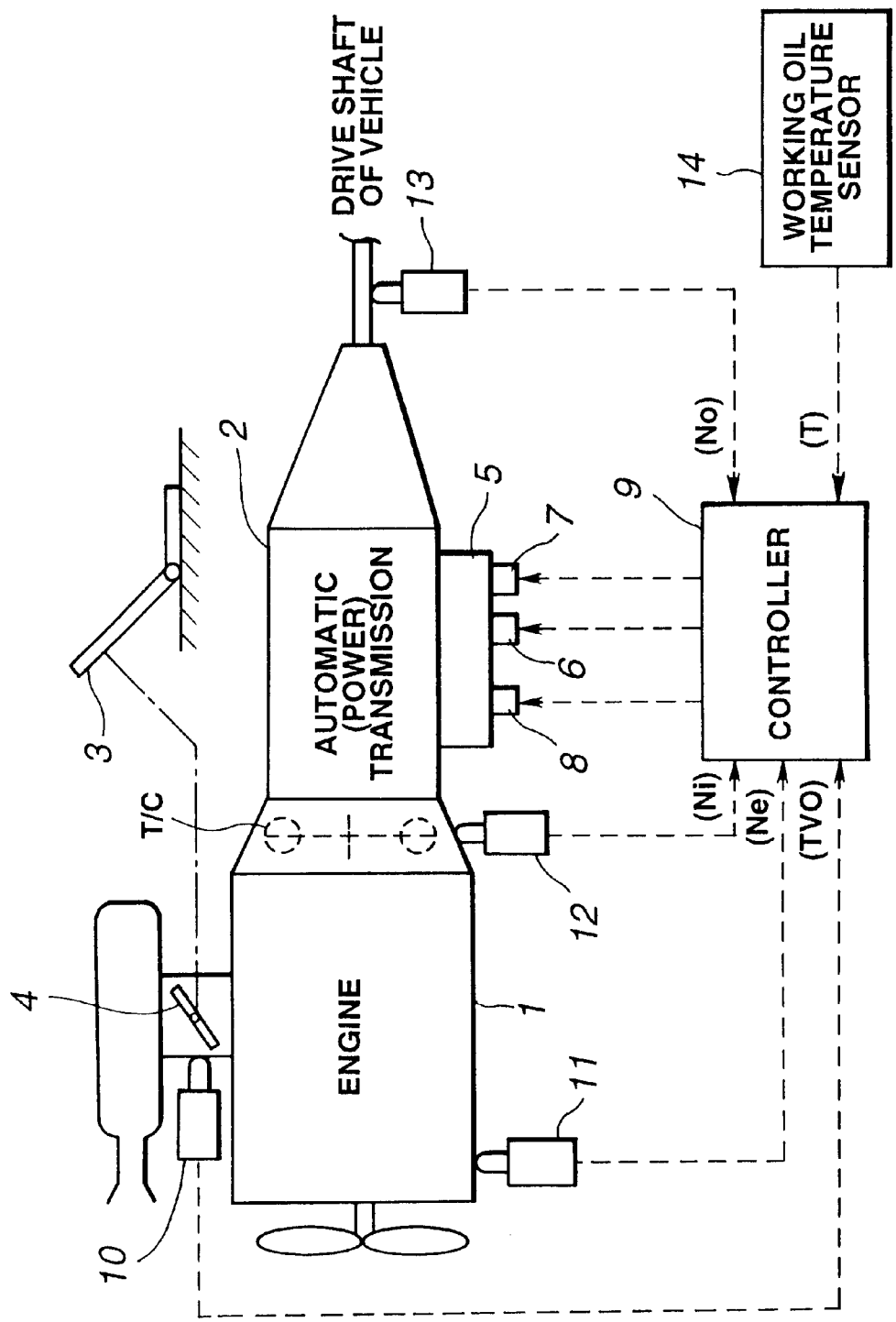
FIG. 1A is a system configuration of a gear shift controlling apparatus for a vehicular automatic transmission in a first preferred embodiment according to the present invention.

FIG. 1A shows a system configuration of a gear shift controlling apparatus for a vehicular automatic transmission in a first preferred embodiment according to the present invention.

Figure 1B:
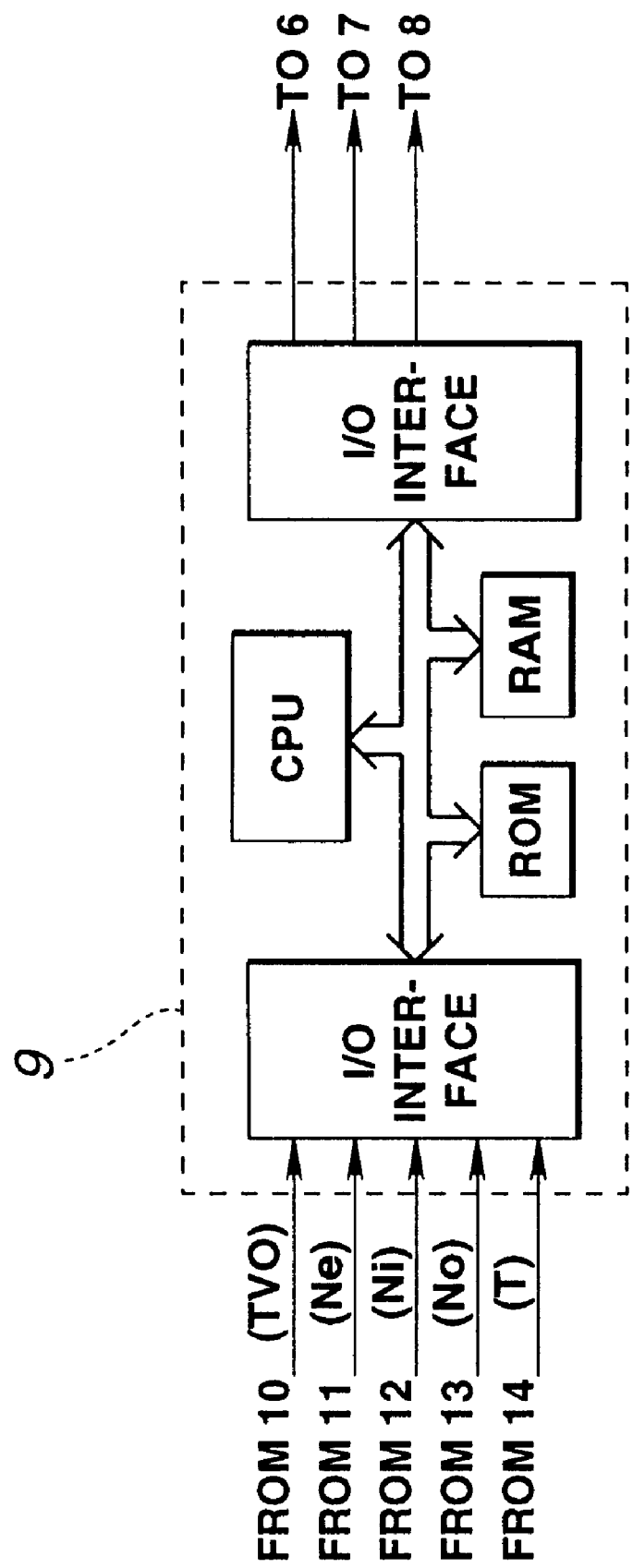
FIG. 1B is a circuit block diagram of an automatic transmission controller shown in FIG. 1A.

FIG. 1B shows a circuit block diagram of an automatic transmission controller in the first embodiment shown in FIG. 1A.

In FIG. 1A, an internal combustion engine 1 includes: an accelerator pedal 3 located in a vehicular passenger compartment near a vehicle driver for being operated according to a torque demand from the vehicle driver; and a throttle valve 4 whose opening angle is dependent on a depression angle of the accelerator pedal 3 interlocked with the throttle valve so that an output of the engine is in accordance with the opening angle of the throttle valve.

An automatic transmission 2 associated with the engine 1 includes a torque converter T/C via which an engine output revolution is inputted.

The automatic transmission 2 includes a control valve 5 having a plurality of shifting solenoids 6, 7, and 8, a combination of power ON and OFF applied thereto determining a selected gear shift range. An engine power is outputted from the automatic transmission 2 with an engine power being gear shifted at a gear ratio in accordance with the selected gear shift range.

An automatic transmission controller 9 (hereinafter, simply referred to as a controller) controls the power ON or OFF of each of the shifting solenoids 6, 7, and 8 according to an input information.

It is noted that the shift solenoids 6, 7, and 8 are duty (ratio) solenoids which are turned to ON and OFF at a high speed, i.e., at a short period of time and can continuously vary their ON time rates.

The controller 9 receives a signal indicating a detected engine revolution speed Ne from an engine revolution speed sensor 11 installed in the engine 1, a signal indicating a detected input axle revolution speed Ni from the torque converter T/C to the automatic transmission 2 from an input axle revolution speed sensor 12 detecting a revolution speed of an input axle of the automatic transmission 2, a signal indicating a detected output axle revolution speed No from an output axle revolution speed sensor 13, and a signal indicating a working oil temperature T from a working oil temperature sensor 14 detecting a temperature of a working oil (liquid) of the automatic transmission 2.

The controller 9 includes a microcomputer, as shown in FIG. 1B, having a CPU (Central Processing Unit), a memory of a RAM (Random Access Memory) and a ROM (Read Only Memory), an Input/Output interface, and a common bus.

The controller 9 executes a control program routines shown in FIGS. 2 through 8 on the basis of the input information described above.

Figure 2:
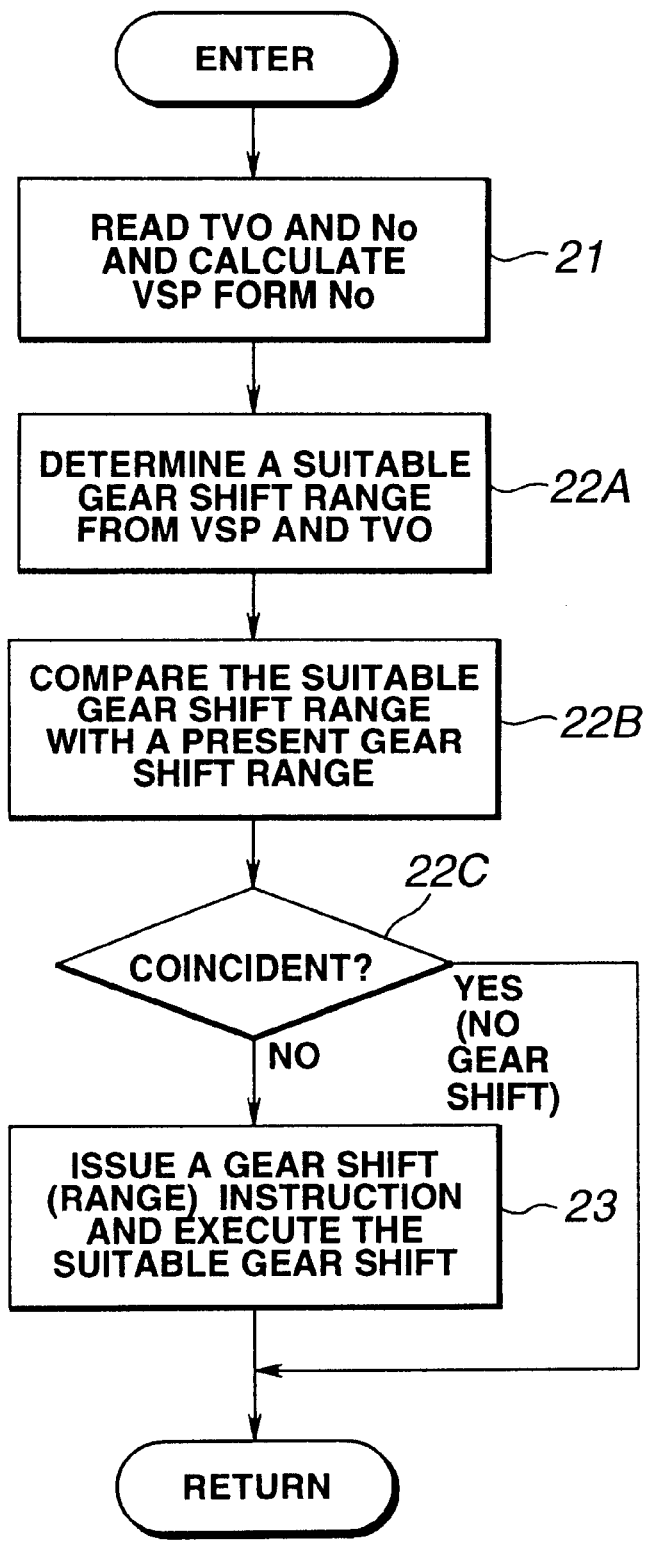
FIG. 2 is a program flowchart indicating a main routine of a gear shift determination to be executed by the automatic transmission controller shown in FIGS. 1A and 1B.

The controller 9 controls the gear shift of the automatic transmission in the following manner:

FIG. 2 shows a main routine of the gear shift control operation executed by the controller 9.

At a first step 21, the CPU of the controller 9 reads the detected opening angle TVO of the throttle valve 4 of the engine 1 and the detected output axle revolution speed No of the automatic transmission 2 and the CPU thereof calculates a vehicle speed VSP from the read output axle revolution speed No.

At a step 22A, the CPU thereof determines a suitable gear shift range (first speed range, second speed range, or so forth) according to the read and calculated opening angle TVO and vehicle speed VSP.

That is to say, the CPU thereof looks up a prescheduled gear shift pattern (not shown) on the basis of the read opening angle TVO and the calculated vehicle speed VSP (which are parameters) to determine the suitable gear shift range which is suitable under the present vehicle driving condition from the prescheduled gear shift pattern.

At a step 22B, the CPU thereof compares the suitable gear shift range determined at the step 22A with the present gear shift range.

At a step 22C, the CPU thereof determines whether the suitable gear shift range is coincident with the present gear shift range.

If these are coincident with each other at the step 22C (yes), the CPU thereof determines that it is not necessary to make the gear shift and the main routine is returned to the step 21, i.e., the present main routine is ended.

If they are not coincident (incongruent) with each other (no) at the step 22C, the main routine advances to a step 23 in which the CPU thereof issues a gear shift instruction so that the power ON or OFF of the shifting solenoids 6, 7, and 8 in the control valve 5 is switched to execute the gear shift to the suitable gear shift range.

The combination of the power ON or OFF of the shifting solenoids 6, 7, and 8 connected to the controller 9 is exemplified by the U.S. Pat. No. 5,478,288 issued on Dec. 26, 1995, the disclosure of which is herein incorporated by reference.

It is noted that, in the first embodiment, the gear shift carried out by an interchange (shift) between frictional elements of the automatic transmission 2, in other words, the gear shift such that while a certain frictional element (the releasing frictional element) is released due to a reduction in a working liquid pressure (hydraulic pressure) applied to the certain frictional element, another frictional element (the clutching frictional element) is clutched due to a rise in the working liquid pressure applied to the other frictional element is executed according to time (sequence) variations (changes with time) of the working liquid pressure (Po) applied to the releasing frictional element and of the working liquid pressure (Pc) shown in the timing charts of FIGS. 9A, 9B, and 9C in accordance with a series of control program flowcharts shown in FIGS. 3 through 8.

FIGS. 3 and 5 through 7 are integrally an interrupt processing routine executed whenever a constant period $\Delta t$ has passed ($\Delta t$=0.01 seconds, (10 milliseconds)). FIGS. 4 and 8 are respectively interrupt processing routines executed for each same constant period $\Delta t$ ($\Delta t$=0.01 seconds).

Figure 3:
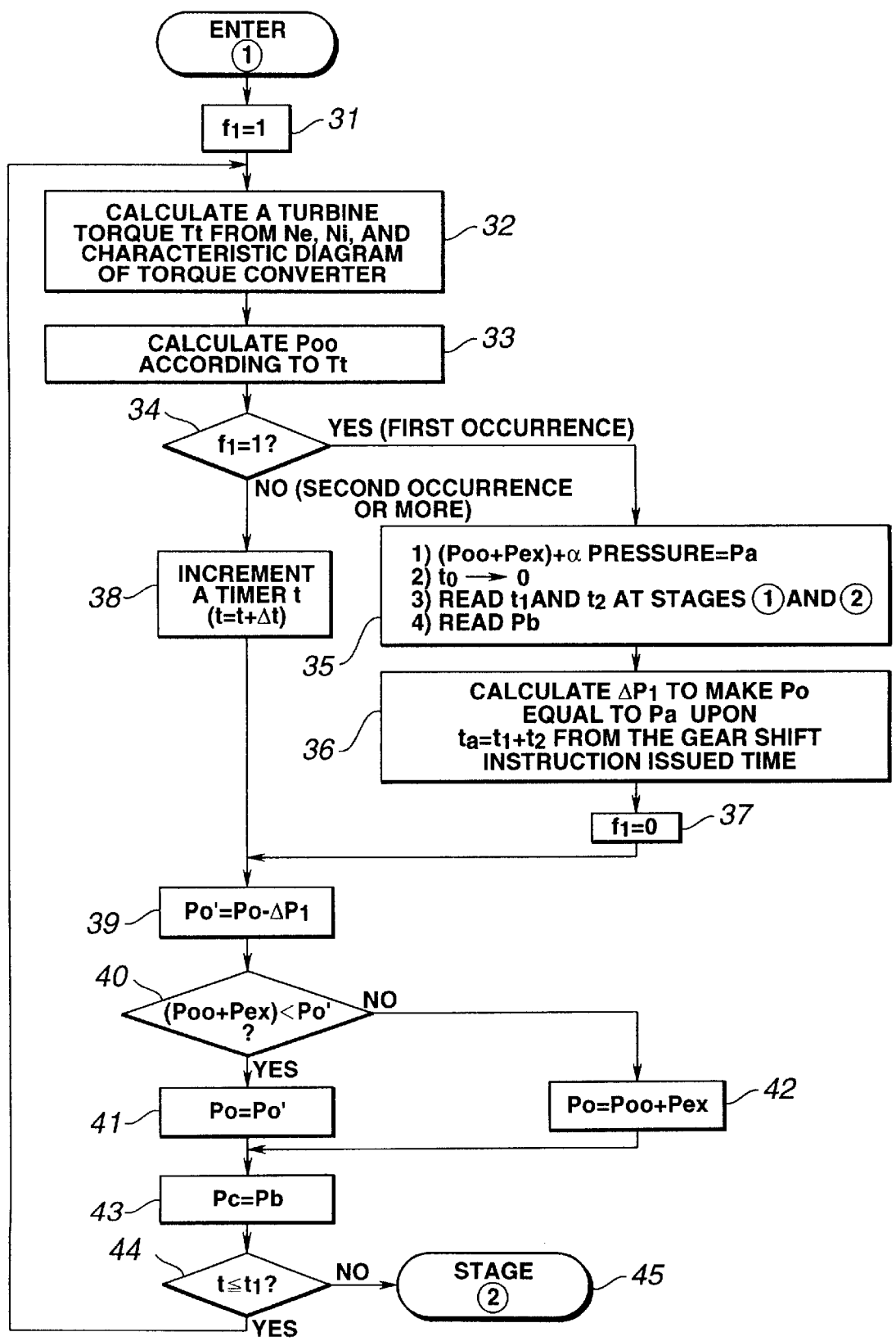
FIG. 3 is a program flowchart indicating a sub routine at a first stage ① related to the gear shift control to be executed by the controller when a gear shift command is issued at the gear shift determination main routine shown in FIG. 2.
Figure 4:
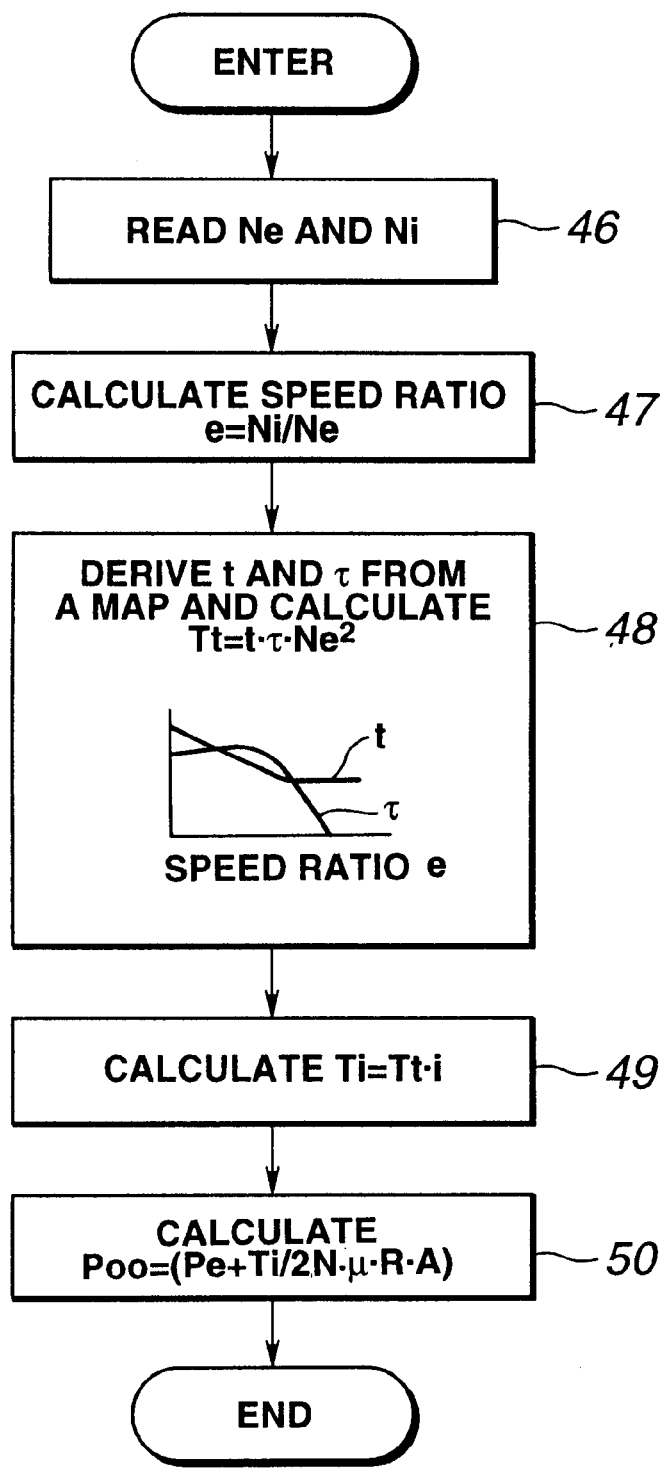
FIG. 4 is a program flowchart indicating a sub routine to calculate a clutching required minimum liquid pressure to be derived at the first stage ① shown in FIG. 3.

In details, FIG. 3 shows a control related to a first stage ① carried out within a time duration t1 immediately upon an issuance of the gear shift as shown in FIGS. 9A, 9B, and 9C.

At a step 31, the CPU of the controller 9 sets a flag f1 indicating a start of the first stage ① to "1" so that a determination of the flag f1 status at a step 34 causes the routine to advance to steps 35, 36, and 37.

It is noted that since at the step 37 the CPU thereof resets the flag f1 to "0", a loop including the steps 35, 36, and 37 is executed only once.

At a step 32, the CPU thereof calculates a turbine torque (transmission input torque) Tt from the engine revolution speed Ne (the input revolution speed of the torque converter T/C), the input axle revolution speed Ni of the transmission 2 (,i.e., the output revolution speed of the torque converter T/C), and a characteristic graph of the torque converter T/C in the following manner with reference to FIG. 4.

As shown in FIG. 4, at a step 46, the CPU thereof reads the engine revolution speed (torque converter input revolution speed) Ne and the transmission input axle revolution speed Ni (torque converter output revolution speed).

At a step 47, the CPU thereof calculates a speed ratio e of the torque converter T/C; e=Ni/Ne.

At a step 48, the CPU thereof searches for a torque ratio t and a torque capacity coefficient $\tau$ from a characteristic graph thereof shown in the step 48.

The CPU thereof calculates a turbine torque (transmission input torque) Tt from the torque ratio T, torque capacity coefficient $\tau$, and torque converter input revolution speed Ne using the following equation (1).

$$Tt=t\tau Ne^2 \qquad (1).$$

Referring back to FIG. 3, at a step 33, the CPU thereof calculates a minimum liquid pressure Poo required to clutch the releasing frictional element (hereinafter, referred to as a clutching required minimum liquid pressure) corresponding to the above-described turbine torque (transmission input torque) Tt.

That is to say, at steps 49 and 50 in FIG. 4, the CPU thereof multiplies, at first, the transmission input torque Tt by a torque partial charging rate i of the releasing frictional element to determine a partial charging torque (required transmission torque) Ti for the releasing frictional element.

Next, using specified constants, namely, a number of clutch plates N in the releasing frictional element, a frictional coefficient $\mu$ of each clutch plate thereof, an effective radius of each clutch plate R, a piston pressure receiving area A, and a return spring force corresponding working liquid pressure Pe, the CPU thereof calculates the minimum liquid pressure Poo required to clutch the releasing frictional element using the following equation:

$$Poo=Pe+(Ti/2N\times\mu\times R\times A) \qquad (2).$$

As described above, at the step 33, the CPU thereof calculates Poo (specifically reads Poo derived at the step 50).

At the step 35 in the loop including the steps 36 and 37, the CPU thereof adds a margin pressure Pex used for avoiding a slip in the releasing frictional element from being occurred to the clutching required minimum liquid pressure Poo. Hence, the CPU thereof determines a predetermined pressure (Poo+Pex) required to bring the releasing frictional element into a state in which the releasing frictional element is about to be released but is still clutched (in an utmost possible limit to a clutched state) under the turbine torque (transmission input torque) Tt and calculates an added value Pa=(Poo+Pex)+$\alpha$ between the predetermined pressure (Poo+Pex) and a given liquid pressure $\alpha$ (refer to FIGS. 9A, 9B, and 9C) corresponding to a moderately reducing pressure used to prevent an occurrence of an undershooting of the reducing liquid pressure.

At the step 35, the CPU thereof also resets a timer T to start a counting of an elapsed time from the time at which the first stage ① is started.

In addition, the CPU thereof reads control time duration t1 and control time duration t2 at the stages ① and ②, the control time duration t1 at the first stage ① being a pre-charge time and the subsequent control time duration t2 at the second stage ② corresponding to a margin time exemplified by FIGS. 9A, 9B, and 9C and reads a pre-charge command pressure Pb to speedily complete a stroke loss (a distance corresponding to a stroke of the corresponding frictional element from a complete clutched position to a complete release position).

It is noted that the control time duration t1 related to the first stage ① is a time duration required for the stroke loss of the clutching frictional element to be completed and, for example, is predetermined for each of plotted transmission working oil (liquid) temperatures T.

In addition, the control time duration t2 related to the second stage ② is predetermined margin time duration t2 added to the first stage control time duration t1 since the undershooting of control occurs at the time of control end due to an excessively quick reduction of the releasing working liquid pressure Po when the reduction in the releasing working pressure Po of the releasing frictional element is completed in such a short time duration as the first stage control time duration t1.

Furthermore, the margin pressure Pex used to prevent the occurrence of the slip to be added to the clutching required minimum liquid pressure Poo for the releasing frictional element may be given as a mapped value for the clutching required minimum liquid pressure Poo such as to be varied according to the clutching required minimum liquid pressure Poo since deviations in a pressure variation characteristic in response to an electronic working liquid pressure control command are dependent upon the clutching required minimum liquid pressure Poo.

Referring back to FIG. 3, at a step 36, the CPU thereof calculates a decreasing (ramp) gradient $\Delta P1$ on the releasing working liquid pressure Po such that the releasing working liquid pressure Po is adjusted to make equal to the above-described pressure Pa ($\because$Pa=(Poo+Pex)+$\alpha$) at a time when a total time duration of t1+t2=ta has elapsed upon the issuance of the gear shift instruction.

At a step 37, the CPU thereof resets the flag f1 to "0" so that the routine at the second occurrence or more (the CPU executes this routine twice or more) is advanced to a step 38 without passing the loop of the steps 35, 36, and 37.

At the second occurrence or more, the routine passes the step 38 in which the timer t is incremented (by $\Delta t$=unit of the calculation processing cycle of the series of the control program routine and equal to 0.01 seconds described above) so that the CPU measures the elapse time from the time at which the first stage ① of FIG. 3 has been started by the timer t.

At the step 39, the CPU thereof calculates a new releasing working liquid pressure calculated value Po' as follows: Po'=Po–$\Delta P1$ (Po; present releasing working liquid pressure command value, $\Delta P1$; derived at the step 36).

At a step 40, the CPU thereof determines whether the new releasing working liquid pressure calculated value Po' is in excess of the above-described predetermined pressure (Poo+Pex) required for the releasing frictional element to be in the utmost possible limit of clutched state described above.

If Po'>(Poo+Pex) (yes) at the step 40, the CPU thereof, at a step 41, updates the present releasing working liquid pressure command value Po to the calculated value Po' (Po→Po') since the CPU thereof estimates that the releasing frictional element would not be slipped.

On the other hand, if Po$\leq$(Poo+Pex) (No) at the step 40, the routine goes to a step 42 in which, in place of the update of Po to Po' as the step 41 does, especially, if Po'<(Poo+Pex), the CPU thereof sets the releasing working liquid pressure command value Po to (Poo+Pex) ($\therefore$Po→Poo+Pex) so that the command value Po is prevented from becoming below (Poo+Pex) since the CPU thereof estimates that there is a possibility of occurrence of the slip on the releasing frictional element.

After the determination of the releasing working liquid pressure command value Po described above, the routine goes to a step 43 in which a clutching working liquid pressure command value Pc (Pc=Pb) is set to the pre-charge command pressure Pb read at the step 35.

The controls over the above-described releasing working liquid pressure and the clutching working liquid pressure are continues until the CPU thereof determines that the timer t has indicated the elapse of time of the first stage control time duration t1 at a step 44.

Consequently, as shown in FIGS. 9A, 9B, and 9C, during the first stage control time duration t1 upon the issuance of the gear shift instruction, the releasing working liquid pressure command value Po is reduced at the ramp gradient $\Delta P1$ while the clutching working liquid pressure command value Pc is held at the pre-charge command pressure Pb, so that the stroke loss in the clutching frictional element can theoretically be completed at an instant time of the completion of the first stage cotnrol time duration t1 described above.

Referring back to FIG. 3, when the CPU thereof determines that the timer t has indicated the elapse of time of the first stage control time duration t1 at the step 44, the routine jumps to a step 45 to start the subsequent second stage of control ②.

Figure 5:
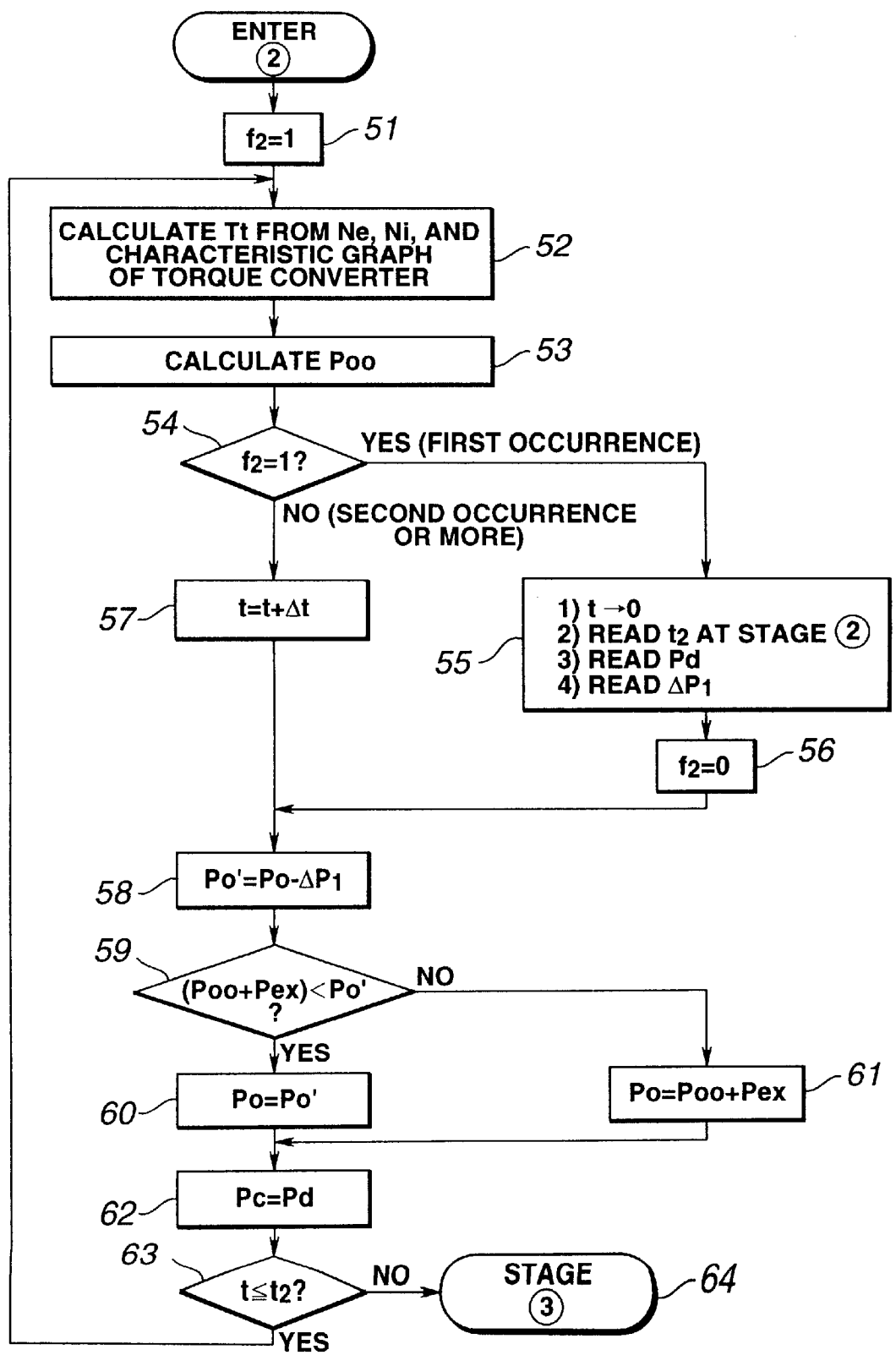
FIG. 5 is a program flowchart indicating a sub routine related to a second stage ② related to the gear shift control.

FIG. 5 shows the part of the program flowchart for the control at the second stage ②.

That is to say, at a step 51, the CPU thereof sets a flag f2 (second flag) to "1" indicating the start of the second stage ②. Hence a loop including steps 55 and 56 is executed only once, with the second flag f2 being reset to "0" at the step 56.

After the step 51, the routine goes to a step 52 in which the CPU thereof calculates the turbine torque Tt (transmission input torque) of the torque converter T/C using the equation (1) described above from the characteristic graph described at the step 32, the engine revolution speed (torque converter input revolution speed) Ne and transmission input axle revolution speed (torque converter output revolution speed) Ni.

At a step 53, the CPU thereof calculates the clutching required minimum liquid pressure Poo applied to the releasing frictional element corresponding to the turbine torque (transmission input torque) Tt from the equation (2) described above in the same way at the step 33 of FIG. 3.

It is noted that the timer t is reset to "0" in order to start the elapse time from the time at which the second stage ② is started at the step 55.

In addition, at the step 55, the CPU thereof reads the control time duration t2 related to the second stage ② and reads a return spring corresponding pressure Pd at a time when the stroke loss is completed for the cluching frictional element.

Furthermore, at the step 55, the CPU thereof reads the reduction ramp gradient $\Delta P1$ of the releasing working liquid pressure Po calculated at the step 36 of FIG. 3.

It is noted that the control time duration t2 at the second stage ② in the margin time duration to be added to the first stage control time duration t1 used to prevent the undershooting as described at the step 35 of FIG. 3.

The return spring corresponding pressure Pd is a value of the clutching working liquid pressure Pc required to render the clutching frictional element in a stroke loss end state.

At the step 56, the CPU thereof resets the second flag f2 to "0" so that the subsequently occurring routine (twice or more) goes from a step 54 to a step 57 without passing through the loop of the steps 55 and 56.

At the step 57, the CPU thereof increments the timer t by $\Delta t$ in the same manner as at the step 36 to measure the elapse time upon the start of the second stage ②.

At the next step 58, the CPU thereof derives the new releasing working liquid pressure calculated value Po' from the present releasing working liquid pressure command value Po from which the ramp gradient $\Delta P1$ derived at the step 55 is subtracted: Po'=Po–$\Delta P1$.

At the next step 59, the CPU thereof determines whether the releasing working liquid pressure calculated value Po' is in excess of the predetermined pressure (Poo+Pex) required for the releasing frictional element to become the utmost possible limit of clutching state (Po'>(Poo+Pex).

If Po'>(Poo+Pex) (yes) at the step 59, the CPU thereof estimates that the releasing frictional element cannot be slipped and the routine goes to a step 60 in which the releasing working liquid pressure command value Po is updated to the above-described calculated value Po'.

On the other hand, if Po' (Poo+Pex) (No) at the step 59, the CPU thereof determines, especially, if Po'<(Poo+Pex), there is the possibility of the occurrence of slip on the releasing frictional element and the routine goes to a step 61 in which the CPU thereof sets the present releasing working liquid pressure command value Po to (Poo+Pex) in place of the update of Po to Po' carried out at the step 60, this Po being not below (Poo+Pex).

After the determination of the releasing working liquid pressure command value Po, the routine goes to a step 63, the CPU thereof sets the clutching working liquid pressure command value Pc to the return spring corresponding value Pd derived at the step 55.

The control over the releasing working liquid pressure Po and the clutching working liquid pressure command value Pc are continued until the CPU thereof determines that the timer t has indicated the second stage control time duration t2 at a step 63.

Hence, as shown in FIGS. 9A, 9B, and 9C, the releasing working liquid pressure command value Po during the control time duration t2 related to the second stage ② upon the end of the first stage control time duration t1 is reduced by the ramp gradient $\Delta P1$ following at the first stage ① and indicates the above-described pressure Pa at an instant time when the second stage ② has just been ended. While the clutching working liquid pressure command value Pc is held at the return spring corresponding pressure Pd so that the clutching frictional element is held at the complete state of the stroke loss.

Referring back to FIG. 5, when the CPU thereof determines that the timer t has indicates that the elapse time corresponding to the end of the second stage ② (t=t2) at the step 63, the routine goes to a step 64 to start a third stage ③.

Figure 6:
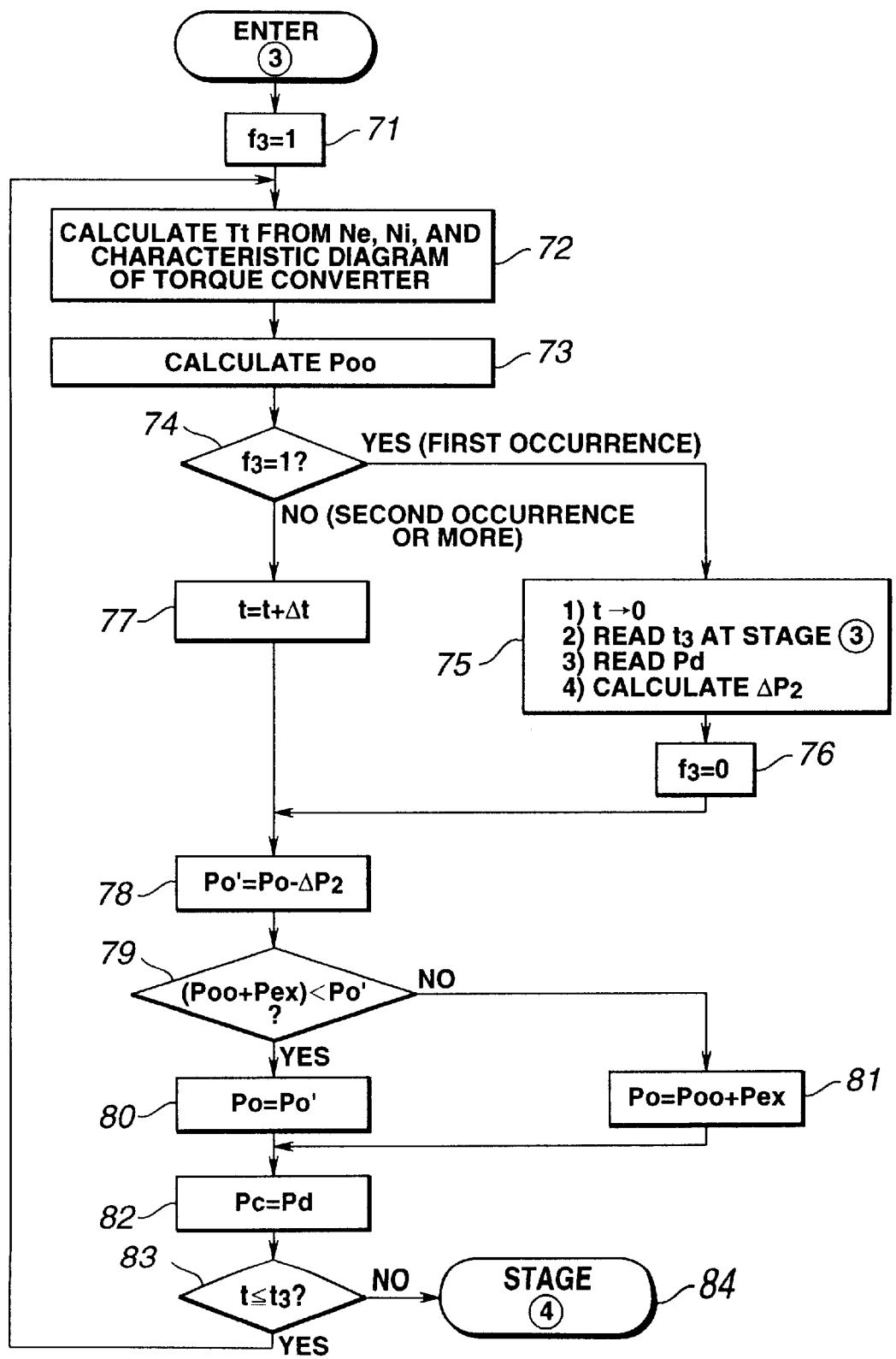
FIG. 6 is a program flowchart indicating a sub routine at a third stage ③ related to the gear shift control.

FIG. 6 shows the control at the third stage ③.

That is to say, at a step 71, the CPU thereof sets a third flag f3 to "1" indicating the start of the third stage ③ of control. Hence, the routine goes to once from a step 74 to a step 75 and a step 76. A loop including the steps 75 and 76 is executed only once since, at the step 76, the third flag f3 is reset to "0".

Then, at a step 72, the CPU thereof calculates the turbine torque Tt (transmission input torque) of the torque converter T/C from the engine revolution speed Ne (input revolution speed of the torque converter T/C), the transmission input axle revolution speed Ni (output revolution speed of the torque converter T/C), and the characteristic graph of the torque converter T/C using the above equation (1) in the same manner as the step 52 of FIG. 5 and as the step 32 of FIG. 3.

At a step 73, the CPU thereof calculates the minimum liquid pressure Poo required for the releasing frictional element to be in the clutched state corresponding to the turbine torque (transmission input torque) Tt derived at the step 72 using the above equation (2) in the same manner as the step 33 of FIG. 3 and as the step 53 of FIG. 5.

At the step 75 which is to be executed only once, the CPU thereof resets the timer t to "0" to start the elapse time upon the start of the third stage ③ and reads the control time duration t3 related to the third stage ③.

It is noted that the control time duration t3 is previously determined with the instantaneous time at which the clutching frictional element has just ended the stroke loss even if an actual rise in the clutching working liquid pressure Pc due to the pre-charge at the first stage ① is most delayed in mind.

Next, at the step 75 after the passage of the step 74, the CPU thereof reads the return spring corresponding pressure Pd of the clutching frictional element read at the step 55 of FIG. 5 and calculates the ramp gradient $\Delta P2$ at the releasing working liquid pressure for the releasing working liquid pressure command value Po to reduce the value Pa at the start of the third stage ③.

At the next step 76, the CPU thereof resets the third flag f3 to "0" so that, at the subsequently processing routine to be executed twice or more (second occurrence or more), the step 74 causes the routine to go to a step 77 without passing the loop of the steps 75 and 76. The timer T is incremented by $\Delta t(t \rightarrow t+\Delta t)$ so that the value of the timer t is advanced by the processing cycle of $\Delta t$ to measure the elapse time upon the start of the third stage ③.

At a step 78, the CPU thereof subtracts the ramp gradient $\Delta P2$ derived at the step 75 from the present releasing working liquid pressure calculated value Po' derived at the step 60 or a step 61 at the time when t=t2 to derive Po'=Po–$\Delta P2$.

At the next step 79, the CPU thereof determines whether the releasing working liquid pressure calculated value Po' is in excess of the predetermined pressure (Poo+Pex) required for the releasing working liquid pressure calculated value Po' to the utmost possible limit of the clutching state.

If Po'>(Poo+Pex) (yes) at the step 79, the CPU thereof updates the releasing working liquid pressure command value Po to the above-described calculated value Po' (Po→Po') since the CPU thereof estimates that no slip occurs on the releasing frictional element.

On the other hand, if Po'≦(Poo+Pex) (No) at the step 79, the CPU thereof, especially if Po'<(Poo+Pex), estimates that there is the possibility of the occurrence of slip on the releasing frictional element and the routine goes to a step 81 in which the CPU thereof sets the releasing working liquid pressure Po to (Poo+Pex), in place of the releasing working liquid pressure command value Po updated to Po', so as to prevent Po from being below (Poo+Pex).

At a step 82 after the determination of the releasing working liquid pressure command value Po, the CPU thereof sets the clutching working liquid pressure command value Pc to the return spring corresponding pressure Pd read at the step 75.

The controls over the releasing working liquid pressure command value Po and the clutching working liquid pressure command value Pc are continued until the CPU thereof determines that the timer T has indicated that the elapse of time corresponding to the control line duration t3 related to the third stage ③.

Hence, as shown in FIGS. 9A, 9B, and 9C, the releasing working liquid pressure command value Po is reduced at the ramp gradient of $\Delta P2$ from the value Pa to be reduced by a to indicate the predetermined pressure (Poo+Pex).

At an instantaneous time of the end of the third stage ③, a clutching force of the releasing frictional element is reduced as low as possible to the utmost possible limit of the clutching state.

On the other hand, the clutching working liquid pressure command value Pc is held at the return spring corresponding pressure Pd and the clutching frictional element is held at the completion state of the stroke loss.

These working liquid pressure controls on these of the frictional elements can cause the start of a torque phase at an instant time when the third stage ③ is ended.

When the CPU thereof determines that the timer t has indicated the elapse of time corresponding to the control time duration t3 related to the third stage ③.

If the CPU thereof determines that the timer t has indicated the elapse of time corresponding to the control time duration t3 related to the third stage ③ at the step 83, (t=t3), the routine goes to a step 84 related to a fourth stage ④ to start the control at the fourth stage ④.

Figure 7:
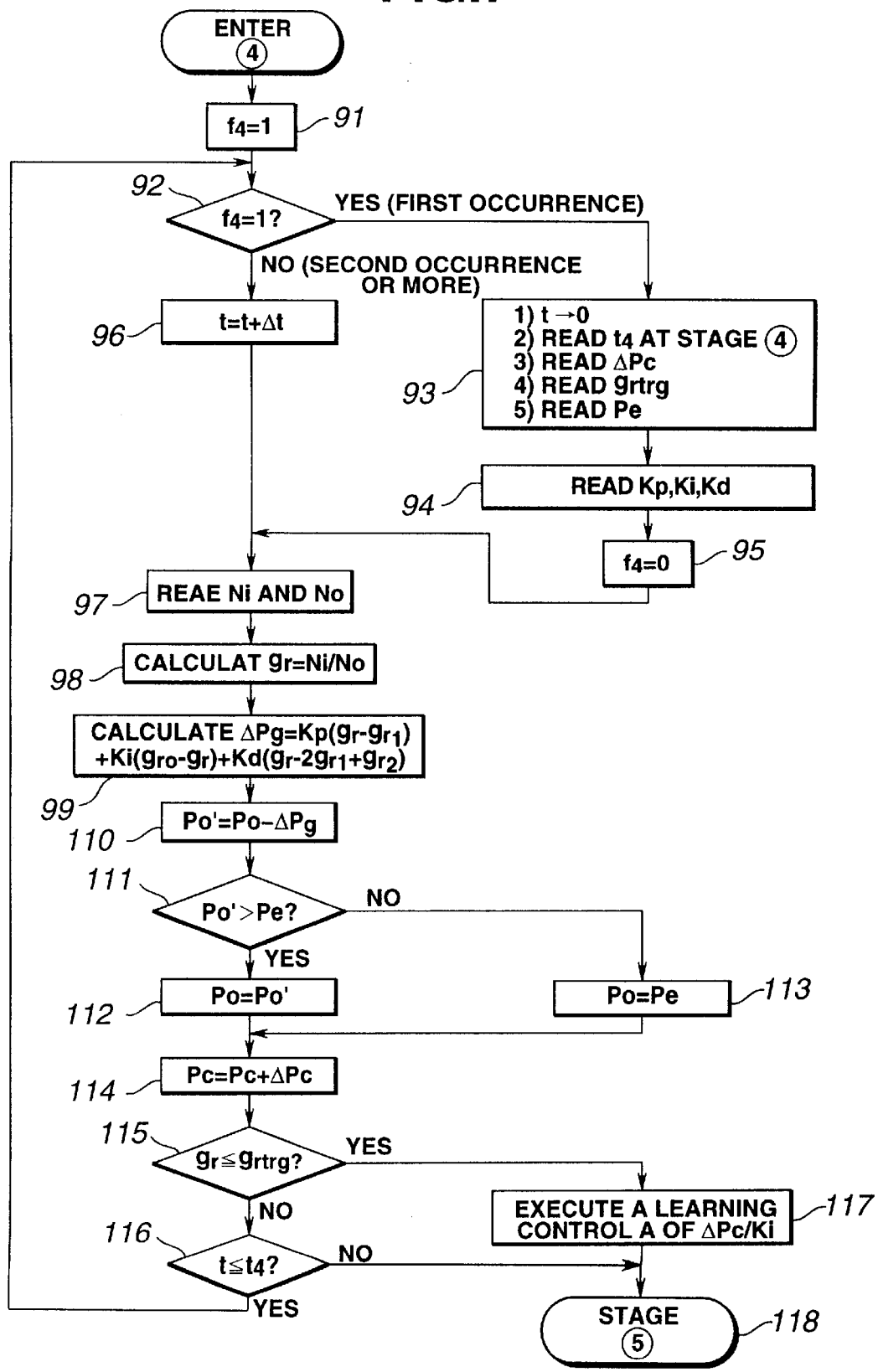
FIG. 7 is a program flowchart indicating a sub routine at a fourth stage ④ related to the gear shift control.

FIG. 7 shows the routine executed at the fourth stage ④.

At a step 91, the CPU thereof sets a fourth flag f4 to "1" indicating that the control at the fourth stage ④ has started so that the determination at a step 92 causes the routine to go to a loop including steps 93, 94, and 95. It is noted that the loop including these steps 93, 94, and 95 is only executed once since, at the step 95, the CPU thereof is reset to "0".

At the step 93 of FIG. 7, the CPU thereof resets the timer T to "0" so as to enable the measurement in the elapse time (torque phase time) from the time at which the control time duration t4 related to the fourth stage ④ is started. It is noted that the control time duration t4 related to the fourth stage ④ is previously set for each kind of gear shift range as a, so-called, fail-safe time duration so as to forcefully end the torque phase to initiate an inertia phase even when the control time duration t4 at which the fourth stage ④ is initiated even when the torque phase cannot be ended due to some cause.

Furthermore, at a step of FIG. 7, the CPU thereof reads a ramp gradient ΔPc which is a rise rate of the clutching working liquid pressure command value Pc related to the fourth stage ④. The ramp gradient Δ Pc is appropriately learned and corrected through a learning control method so that the torque phase time duration gives a suitable time value as will be described later.

At the step 93, the CPU thereof reads a set gear ratio $g_{rtrg}$ to determine the start of the inertia phase (determine the end of torque phase). The set gear ratio $g_{rtrg}$ is defined at a gear ratio slightly offset from the gear ratio before the gear shift (a gear shift prior ratio) to the gear ratio after the gear shift (a gear shift following ratio) occurs as shown in FIGS. 9A, 9B, and 9C and is predetermined for each kind of the gear shift (,e.g., 1→2, 2→3, 3→4, 3→1 or so forth).

At the step 93, the CPU thereof reads the return spring corresponding pressure Pe of the releasing frictional element. It is noted that a clutching capacity of the releasing frictional element is set to zero when the return spring corresponding pressure Pe is supplied thereto.

At the next step 94, the CPU thereof reads control constants used when calculating the releasing working liquid pressure command value Po as will be described later during the torque phase, i.e., a proportional control constant Kp, an integration control constant Ki, and a differential control constant Kd, respectively.

It is noted that although both proportional control constant Kp and differential control constant Kd are predetermined fixed values, the integration control constant Ki is varied such as to become enlarged as the working liquid (oil) temperature T becomes low and is calculated so that the clutching capacity of the releasing clutching frictional element as will be described below with reference to a step 99 is assured to be nullified before the elapse of time corresponding to a time tc which is shorter than the control time duration t4 related to the fourth stage ④, the integration control constant Ki being further corrected through the learning control so that the torque phase time duration, as will be described later with reference to FIG. 8, becomes the suitable time duration.

At the step 95, the fourth flag f4 is reset to "0" so that the subsequent routine goes to a step 96 without passing the loop of the steps 93, 94, and 95.

At a step 96, the CPU thereof increments a timer t by Δt (t→t+Δt) so as to measure the elapse of time upon the start of the fourth stage ④, i.e., the torque phase time duration.

At the next step 97, the CPU thereof reads the input axle revolution speed Ni of the transmission and output axle revolution speed No.

At a step 98, the CPU thereof calculates an effective gear ratio $g_r$ according to the input and output revolution speeds Ni and No using the following equation $g_r$=Ni/No.

At a step 99, the CPU thereof calculates an operating variable ΔPg per the calculation processing cycle of the releasing working liquid pressure command value Po required for the gear ratio $g_r$ to be maintained at a target gear ratio $g_{ro}$ during the torque phase from the gear ratio $g_r$, a previous one $g_{r1}$, twice previous one $g_{r2}$, and the target gear ratio $g_{ro}$ set to a slightly higher value than the prior gear ratio, as shown in FIGS. 9A, 9B, and 9C, using the following PID calculation.

It is noted that $\Delta P_g$ is plus when it is incremented and is minus when it is decremented.

$$\Delta P_g = K_p(g_r - g_{r1}) + Ki(g_{ro} - g_r) + Kd(g_r - 2g_{r1} + g_{r2}) \quad (3).$$

It is noted that if the releasing frictional element does not slip and, hence, the engine 1 is not temporarily idle with the accelerator pedal (gas pedal) depressed (with the transmission 2 in an instantaneous neutral), the following conditions are established: $g_r = g_{r1} = g_{r2}$=gear shift prior gear ratio and the equation (3) can be substituted into:

$$\Delta Pg = Ki(g_{ro} - g_r) \cdots \quad (4).$$

As described above, the integration control constant Ki is calculated so that the releasing working liquid pressure command value Po is reduced from the predetermined pressure (Poo+Pex) at the time of start of the torque phase to the return spring corresponding pressure Pe in order for the clutching capacity of the releasing frictional element to become zero without failure before the elapse of time corresponding to the suitable torque phase time duration tc shorter than the control time duration t4 related to the fourth stage ④, in other words, the operating variable Δ $P_g$ of the releasing working liquid pressure command value giving Δ Pg=[(Poo+Pex)−Pe]/tc. Hence, the integration control constant Ki in the equation (4) is derived as follows:

$$Ki = [(Poo + Pex) - Pe]/[te(g_{ro} - g_r)] \quad (5).$$

Hence, when the CPU thereof calculates the operating variable ΔPg per one calculation processing cycle of the releasing working liquid pressure command value Po during the torque phase according to the equation (3), the CPU thereof calculates ΔPg so that the clutching capacity of the releasing frictional element to be "0" without failure before the elapse of time corresponding to the suitable torque phase time tc which is shorter than the control time duration t4 related to the fourth stage ④ using the value of Ki derived from the equation (5).

At a step 110, the CPU thereof calculates the new releasing working liquid pressure calculated value Po' from the present releasing working liquid pressure command value Po subtracting Δg calculated at the step 99 as Po'=Po−ΔPg.

At the next step 111, the CPU thereof determines whether the derived releasing working liquid pressure calculated value Po' is in excess of the return spring corresponding pressure Pe by which the clutching capacity of the releasing frictional element is made zero.

If Po'>Pe (yes) at the step 111, the routine goes to a step 112 in which the releasing working liquid pressure command value Po is updated to the calculated value Po' since the CPU of the controller 9 estimates that no slip occurs on the releasing frictional element.

On the other hand, if Po'≦Pe (No) at the step 111, the CPU thereof estimates that there is possibility for the releasing frictional element to be slipped and, especially if Po'<Pe, the routine goes to a step 113 in which the CPU thereof sets the releasing working liquid pressure command value Po to the return spring corresponding pressure Pe in place of the update of the releasing working liquid pressure command value Po to the calculated value Po' as the step 112 does to prevent Po from being below Pe At a step 114, the CPU thereof sets the clutching working liquid pressure command value Pc to be raised at the ramp gradient ΔPc derived at the step 93 (Pc→Pc+Pc+ΔPc).

These controls of the releasing working liquid pressure Po and the clutching working liquid pressure Pc are continued at an instantaneous time of the start of the inertia phase as shown in FIGS. 9A, 9B, and 9C at which the gear ratio $g_r$ is determined to be reduced to the set gear ratio $g_{rtrg}$ or until the timer t at a step 116 has indicated that a torque phase forced end time t4 (control time duration related to the fourth stage set for the fail-safe purpose has passed.

Hence, as shown in FIGS. 9A, 9B, and 9C, during the torque phase from the time at which the third stage ③ has been completed to the time at which the inertia phase is started, the clutching working liquid pressure command value Pc rises at the ramp gradient ΔPc and, on the other hand, the releasing working liquid pressure command value Po is reduced from the value of (Poo+Pex) under a feedback control mode so that the gear ratio $g_r$ is maintained at the target gear ratio $g_{r0}$.

The interchange (shift) between the clutching and releasing frictional elements causes the torque phase to be completed and the inertia phase to be started.

In addition, since the integration control constant Ki which is the control gain (reduction variation rate) of the releasing working liquid pressure command value Po is defined in the equation (5), the torque phase is positively completed without failure upon the elapse of time corresponding to the suitable torque phase time tc so as to enable the start of the inertia phase.

Therefore, such a problem that a time duration of interlocking state in which both clutching and releasing frictional elements are clutched becomes so long that the torque absorption (or torque reduction) is brought out to reduce the gear shift quality can be prevented.

In addition, as described above, since the integration control constant Ki which is the control gain (reduction variation rate) of the releasing working liquid pressure command value Po becomes shorted (smaller) as the working oil (liquid) temperature becomes low, the reduction in the gear shift quality described above can be prevented even if a releasing response delay of the releasing frictional element to the releasing working liquid pressure command value Po becomes more remarkable as the working oil temperature T becomes low.

It is noted that if the CPU thereof determines that the torque phase has been ended ($g_r \leq g_{rtrg}$) at the step 115, the routine goes to a step 117 in which the ramp gradient ΔPc for the clutching working liquid pressure as will be described later with reference to FIG. 8A and the integration control constant Ki are controlled in a learning control mode (hereinafter referred to as a learning control A) so that the torque phase time makes suitable. Thereafter, the routine goes to a step 118 in which a fifth stage ⑤ is started.

On the other hand, if the CPU thereof determines that the torque phase is not yet ended ($g_r > g_{rtrg}$) at the step 115, the routine goes to the step 116.

If t>t4 (No) at the step 116, the CPU thereof determines that the timer T has indicated the time duration t4 and the routine goes to the step 118 to start the fifth stage ⑤ with the step 117 skipped.

The control constant at the fifth stage ⑤ at a step 118 is the controls over the clutching and releasing working liquid pressures during the inertia phase as shown in FIGS. 9A, 9B, and 9C.

At the same time when the inertia phase is started, the releasing working liquid pressure command value Po is set to zero and the clutching working liquid pressure command value Pc is raised at the gradient ΔPd which is smaller than ΔPc during the initially set predetermined time.

The feedback control, thereafter, is carried out so that the gear ratio $g_r$ is varied smoothly from $g_{rtrg}$ toward the gear shift following (after) gear ratio during the interval of inertia phase.

As shown in FIGS. 9A, 9B, and 9C, the gear ratio $g_r$ to the gear shift following gear ratio and the clutching working liquid pressure Pc is raised abruptly to its original pressure upon the end of the gear shift.

Figure 8A:
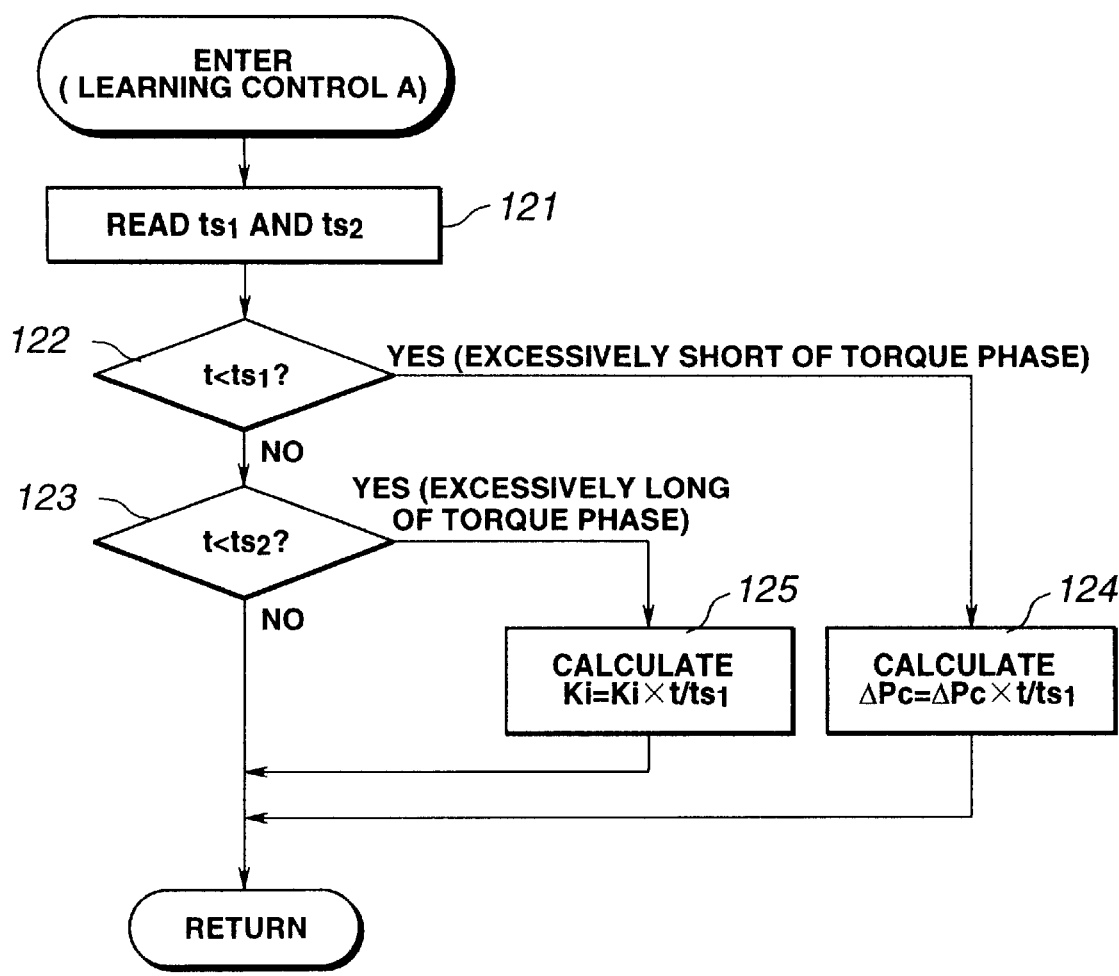
FIG. 8A is a program flowchart indicating a learning control program A related to a variation rate of clutching working liquid pressure and releasing working liquid pressure to be executed to bring a torque phase time duration into a suitable torque phase time duration value during the gear shift control in FIGS. 2 to 7.

The learning control A at the step 117 is as shown in FIG. 8A.

That is to say, at a step 121, the CPU thereof reads a lower limit value ts1 and an upper limit value ts2 for the suitable torque phase time duration.

It is noted that, at steps 122 and 123, the CPU thereof determines whether the torque phase time duration t measured in FIG. 7, in other words, the torque phase time is shorter than the lower limit value ts1 of the suitable torque phase time, or falls within a suitable range within these upper and lower limit values ts1 and ts2.

If the torque phase time t is shorter than the lower limit value ts1 of the suitable torque phase time ts1 (t<ts1), this disadvantage is caused by too quick clutching of the clutching frictional element. Therefore, the routine goes to a step 124 in which the ramp gradient Δ Pc which is the rise variation rate of the clutching working liquid pressure at a step 124 is corrected so to be reduced.

In order to reduce the correction, the CPU thereof calculates the new ramp gradient ΔPc of the clutching working liquid pressure with a ratio of an actual torque phase time t with respect to a lowest limit value ts1 of the suitable torque phase time duration as follows: ΔPc=ΔPc+t/t31.

In a case where the torque phase time duration t is longer than the upper limit value ts2 of the suitable torque phase time, this disadvantage is caused by the release delay of the releasing frictional element. Hence, at a step 125, the CPU thereof corrects the integration time constant Ki which determines the reduction variation rate of the releasing working liquid pressure becomes abrupt so as to be abrupt at a step 125.

Hence, even if the variations in the frictional coefficients that the clutching frictional elements have are different from each other, the controller 9 can always fall in the torque phase time t within a suitable range without failure. It is possible to maintain a good gear shift quality of the automatic transmission 2 permanently (semi-permanently). A high commercial value as the automatic transmission can be achieved.

According to the above-described learning control such that the torque phase time t is forced to fall in the suitable range between the lower and upper limit values ts1 and ts2 of the suitable torque phase time, it is possible to prevent a control hunting from being occurred. Furthermore, when the ramp gradient ΔPc of the clutching working liquid pressure and the integration control constant Ki of the releasing working liquid pressure are corrected according to the learning control and the torque phase time t and the lowest time value ts1 of the suitable torque phase time are used, such a correction as to optimally match with the actual situation is carried out and an excessive lack in the above-described correction can be avoided.

(Second Embodiment)

Figure 10:
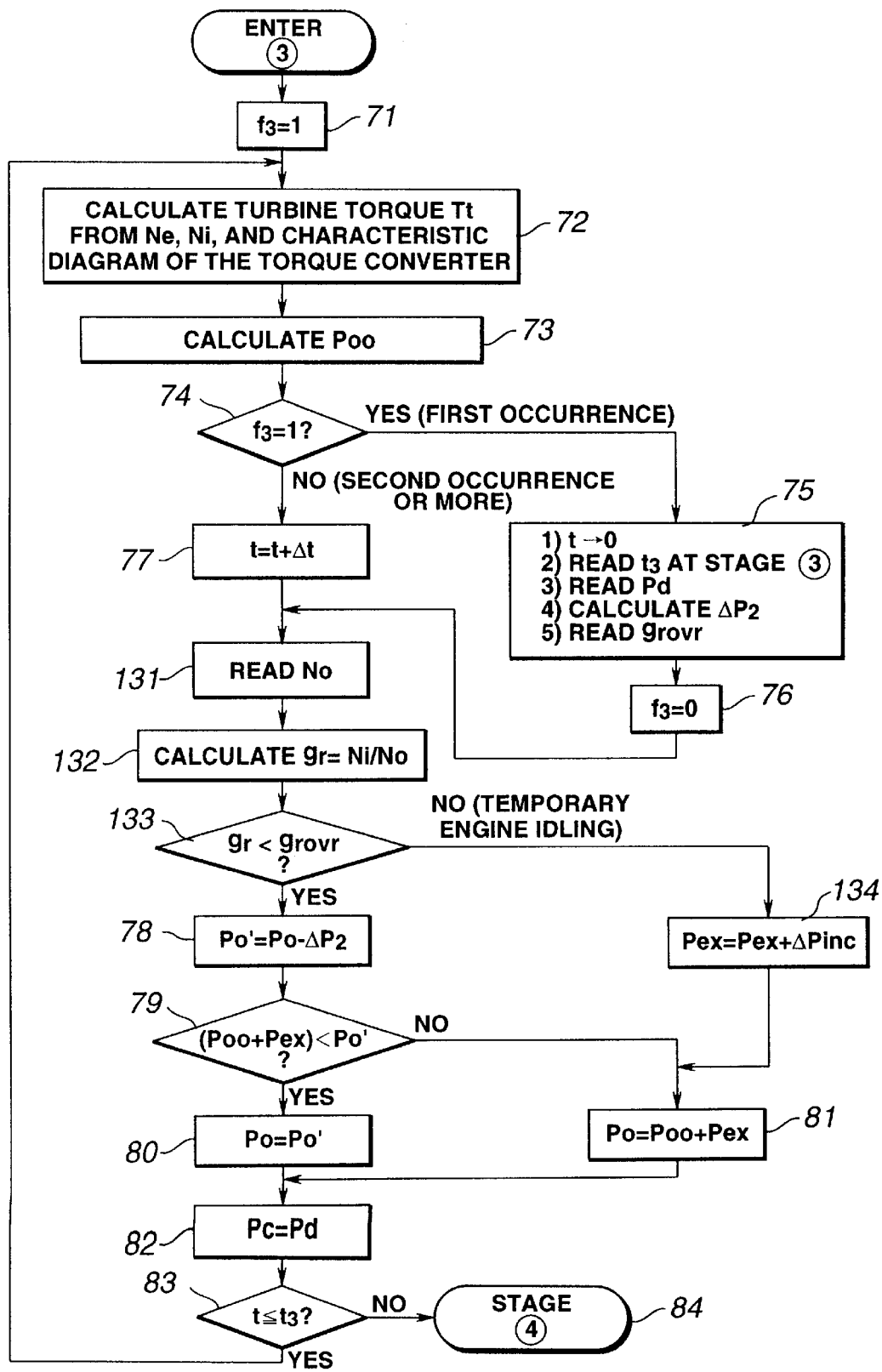
FIG. 10 is a program flowchart indicating the sub routine to be executed by the controller related to the third stage ③ in a case of a second preferred embodiment according to the present invention.

FIG. 10 shows a second preferred embodiment according to the present invention.

That is to say, FIG. 10 shows the program flowchart related to the third stage ③. It is noted that the other program flowcharts and structure of FIGS. 1A and 1B in the first embodiment are applicable to the second embodiment.

The contents of the same numbered steps in FIG. 10 as those shown in FIG. 6 in the first embodiment are generally the same.

However, at the step 75 of FIG. 10, the CPU thereof reads a temporary engine idling determination gear ratio $g_{rovr}$ used for the CPU thereof to determine whether the temporary engine idling along with the occurrence of slip for the releasing frictional element occurs in addition to the above-described processing described at the step 75 in FIG. 6.

In addition, steps 131 through 134 are added after the steps 76 and 77.

That is to say, at the step 131, the CPU thereof reads the output axle revolution speed No of the automatic transmission 2.

At the step 132, the CPU thereof calculates the effective gear ratio $g_r$=Ni/No from the output axle revolution speed No of the automatic transmission No and from the input axle revolution speed Ni of the automatic transmission.

At a step 133, the CPU thereof determines whether the calculated effective gear ratio $g_r$ is below the engine idling determination gear ratio $g_{rovr}$ ($g_r$<$g_{rovr}$), i.e., whether the temporary engine idling does not occur or the effective gear ratio $g_r$ is above the temporary idling determination gear ratio $g_{rovr}$ (i.e., the temporary engine idling occurs).

If the CPU thereof determines that the temporary engine idling does not occur ($g_r$<$g_{rovr}$) at the step 133, the routine goes to the step 78 in which the same processing as the same step of FIG. 6 is executed.

On the other hand, if the CPU thereof determines that the engine temporary idling occurs ($g_r$≧$g_{rovr}$ (No)) at the step 79, the routine goes to the step 134 in which the margin pressure Pex used for avoiding the slip occurrence to be added to the minimum liquid pressure Poo required to clutch the releasing frictional element described above is augmented by the predetermined value Δ Pinc and, thereafter, the routine goes to a step 81 in which the predetermined pressure (Poo+Pex) for the releasing frictional element at the instantaneous time when the torque phase of FIG. 9 is started is raised.

Hence, since the start of the torque phase can be compensated for in the manner such that the slip of the releasing frictional element does not occur, such a problem that the temporary engine idling is developed when the releasing working liquid pressure is feedback controlled so that the temporary engine idling quantity in the engine is coincident with the target value as described in the BACKGROUND OF THE INVENTION can be avoided.

Furthermore, the torque phase can be started without failure at a point of time at which the releasing frictional element falls in a state immediately before the occurrence of slip.

It is not always necessary to perform the feedback control during such a short torque phase time duration according to the above-described torque phase start control shown in FIG. 10. Then, the problem of the slip occurrence can be coped with an after-event control method such as the learning control described above.

Hence, a system's highly responsive characteristic is not required.

It is costly effective. The reduction of the gear shift controlling apparatus into practice can be facilitated.

(Third Embodiment)

Figure 11:
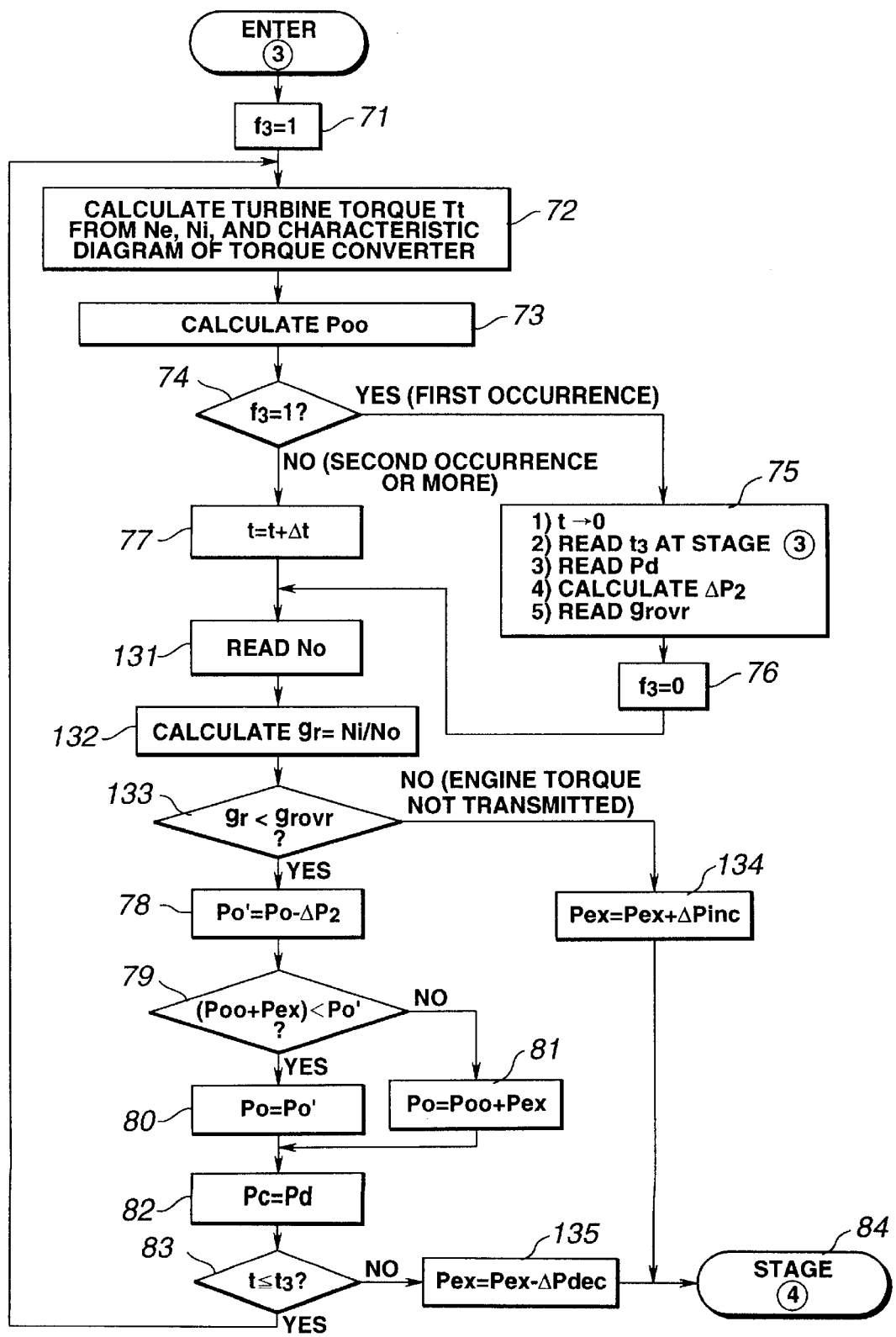
FIG. 11 is a program flowchart indicating a subroutine related to the third stage ③ in a third preferred embodiment of the gear shift controlling apparatus according to the present invention.

FIG. 11 shows a third preferred embodiment of the gear shift controlling apparatus according to the present invention.

It is noted that FIG. 11 shows the control at the third stage ③ and the structure and the other parts of the program flowchart except FIG. 11 described in the first embodiment are the same as those in the third embodiment.

It is also noted that FIG. 11 shows the control at the third stage ③ and the structure and the other parts of the program flowcharts except FIG. 11 described in the first embodiment are the same as those in the third embodiment.

It is also noted that FIG. 11 shows the control at the third stage ③ and the structure and the other parts of the program flowchart except FIG. 11 described in the fifth embodiment are the same as those in the third embodiment.

It is also noted that the contents of the same numbered steps as those shown in FIGS. 6 and 10 are generally the same as those shown in FIG. 11.

In the third embodiment shown in FIG. 11, the margin pressure Pex used for avoiding the occurrence of the slip is augmented by the predetermined value of Δpinc at the step 134 when the temporary engine idling determined to occur at the step 133. Hence, the predetermined pressure (Poo+Pex) for the releasing frictional element at an instantaneous time of the start of the torque phase of FIGS. 9A, 9B, and 9C is raised. Thereafter, the control routine goes directly to the step 84 so as to forcefully start the torque phase. Consequently, such an inconvenience that the torque phase is not started even though the temporary engine idling along with the occurrence of the slip for the releasing frictional element has occurred can be avoided. In other words, a reduction of durability of the releasing frictional element can be avoided.

Since the torque phase is forcefully started, the margin pressure Pex used for avoiding the occurrence of slip augmented by the predetermined value ΔPinc at the step is adopted at the next gear shift occurrence.

When the next gear shift occurs, the torque phase start control such as not to develop the temporary engine idling along with the slip on the releasing frictional element can be achieved.

On the other hand, if the CPU thereof determines that the temporary engine idling occurs at a step 133 ($g_r$<$g_{rovr}$), the same steps 78, 79, 80, and 83 are processed.

Thereafter, when, at the step 83, the CPU thereof determines that the control time duration t3 related to the third stage ③ has elapsed, the margin pressure Pex used for avoiding the occurrence of slip is decreased by the predetermined value Δ Pdec. After the predetermined pressure (Poo+Pex) (refer to FIGS. 9A, 9B, and 9C) for the releasing frictional element at an instantaneous time of the torque phase used when the next gear shift occurs is reduced, the torque phase is started at the step 84.

In the third embodiment wherein the predetermined pressure (Poo+Pex) for the releasing frictional element at an instantaneous time of the start of the torque phase unless the temporary engine idling along with the occurrence of slip for the releasing frictional element occurs, the predetermined pressure (Poo+Pex) can be reduced up to the limit. The value of (Poo+Pex) can be matched with the value corresponding to the state wherein the releasing frictional element is immediately before the occurrence of slip.

Then, the more desired start control for the torque phase can be achieved.

It is noted that if the incremental variable of A Pinc at the step 134 and the more remarkable desired start control for the torque phase can be achieved.

(Fourth Embodiment)

Figure 12:
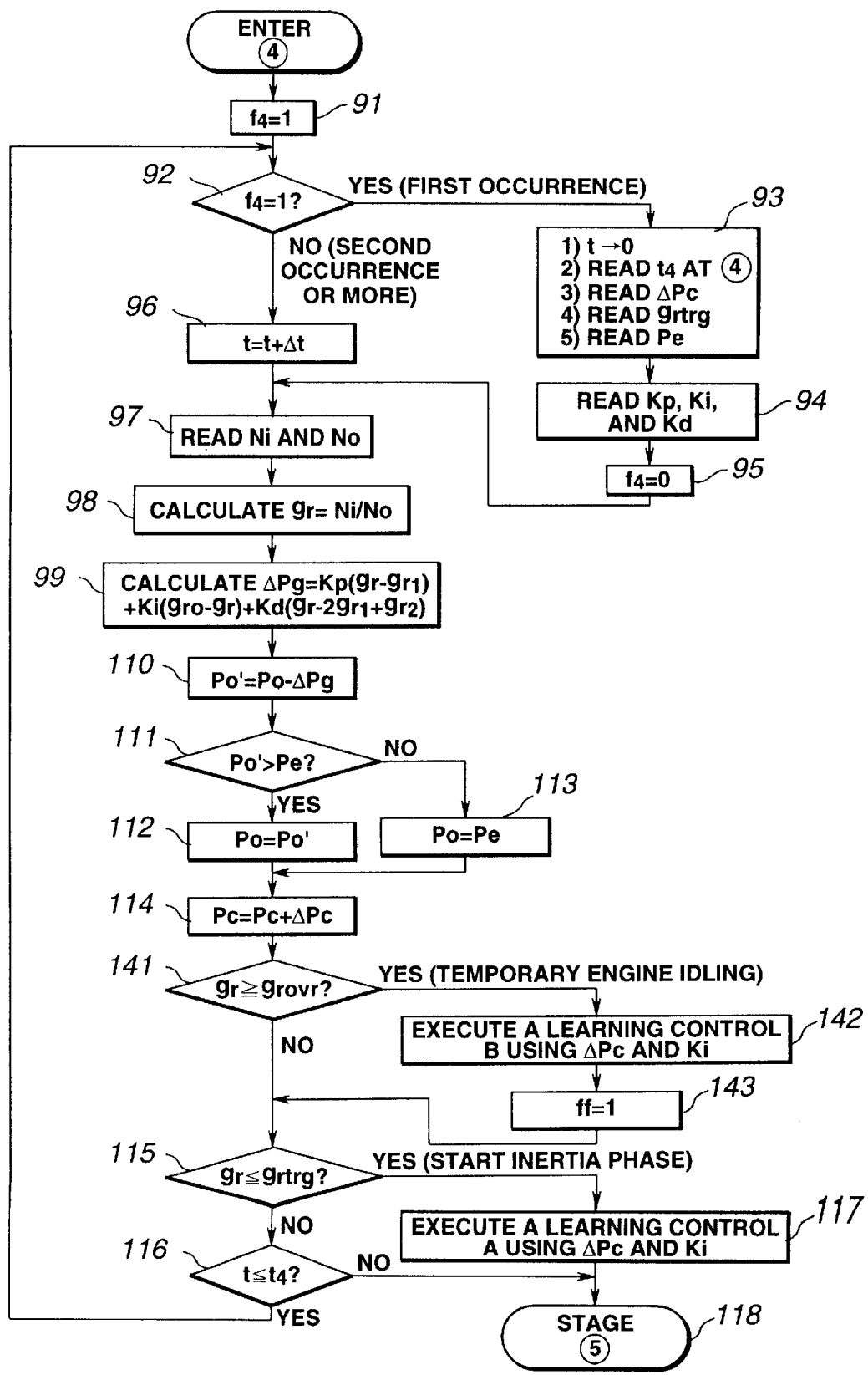
FIG. 12 is a program flowchart indicating a subroutine related to the fourth stage ④ in a fourth preferred embodiment of the gear shift controlling apparatus according to the present invention.

FIG. 12 shows a fourth preferred embodiment of the gear shift controlling apparatus according to the present invention. It is noted that although FIG. 12 shows the control related to the fourth stage ④, the contents of the same numbered steps of FIG. 12 as those shown in FIG. 7 described in the first embodiment are generally the same as those in the fourth embodiment.

It is noted that although the CPU thereof reads the integration control constant Ki at the step 94, the CPU thereof may calculate the integration control constant Ki.

In the fourth embodiment, steps 141, 142, and 143 are newly intervened between the steps 114 and 115 shown in FIG. 12 so that a learning control B on the corrections for the incremental ramp gradient of Δ Pc and the integration control constant Ki used to determine the decreasing gradient of the releasing working liquid pressure is added to form the fourth embodiment.

That is to say, at the step 141, the CPU thereof determine whether the temporary engine idling due to the slip on the releasing frictional element during the torque phase occurs, i.e., $g_r \geq g_{rovr}$ (yes) at the step 141, the routine goes to the step 142 in which the learning control of B for preventing the unfavorable temporary engine idling is executed. At the next step 143, the CPU thereof sets a flag ff to "1" indicating the start of the learning control of B at the step 143. Then, the routine goes to the step 115 to perform the same processing as in the previous embodiment.

If $g_r < g_{rovr}$ (No) at the step 141, the routine goes to the step 114 without passing the loop of the steps 142 and 143.

Figure 13:
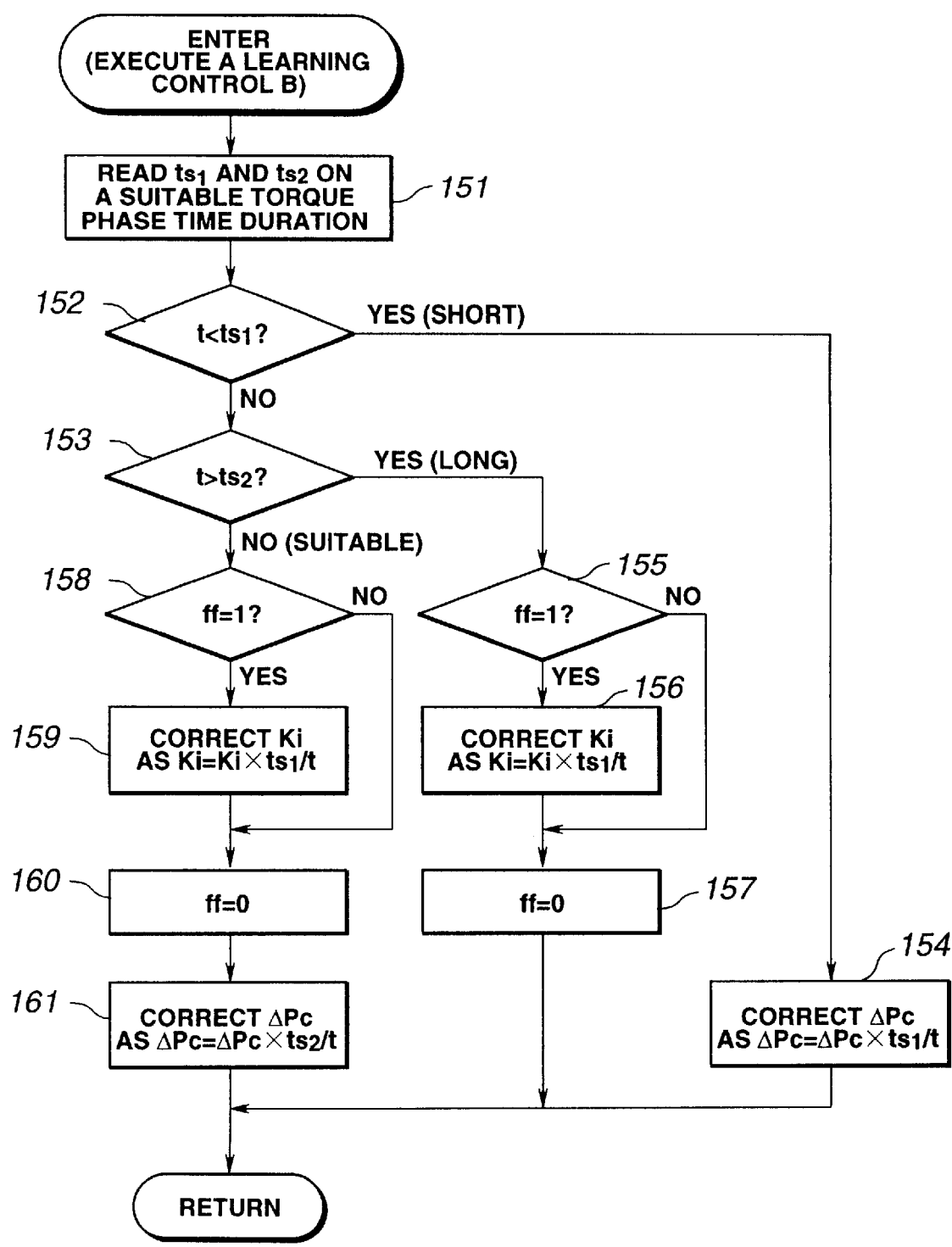
FIG. 13 is a program flowchart indicating a learning control program (B) on the clutching working liquid pressure and releasing working liquid pressure variation rate to be executed for preventing a temporary engine idling from being occurred which is to be added in the program flowchart shown in FIG. 12.

FIG. 13 shows the subroutine of the step 142, i.e., the detailed flowchart on the learning control B.

At a first step 151 of FIG. 13, the CPU thereof reads the upper and lower limit values ts1 and lower limit value ts2 of the suitable torque phase time in the same way as FIG. 8.

At the next steps 152 and 153, from the measurement time of the timer t carried out in FIG. 12 in the same way as FIG. 7, the CPU thereof determines whether the torque phase time is shorter than the lower limit value ts1 of the suitable torque phase time, is longer than the upper limit value ts2 of the suitable torque phase time, or falls within the suitable range between these upper and lower limit values.

If the torque phase time t is shorter than the lower limit value ts1 of the suitable torque phase time (t<ts1, yes) at the step 152, the routine goes to a step 154 in which the ramp gradient ΔPc which is the rise variation rate (ΔPc=dPc/dt) of the clutching working liquid pressure is incrementally corrected: ΔPc=ΔPc×ts1/t (,i.e., the present ΔPc is multiplied by the ratio of the lower limit value ts1 of the suitable torque phase time with respect to the actual torque phase time t to derive the newly augmented ramp gradient ΔPc for the clutching working liquid pressure.

If the torque phase time t is longer than the upper limit value ts2 of the suitable torque phase time (t>ts2, yes) at the step 153, the routine goes to a step 155 in which the CPU thereof determines that the flag ff is at a "1". If ff is at a "1" (yes) at the step 155, the routine goes to a step 156 in which the CPU thereof calculates Ki which is corrected as Ki=Ki× ts1/t (the integration control constant Ki used to determine the reduction variation rate of the releasing working liquid pressure is corrected to be reduced so that the reduction variation rate of the releasing working liquid pressure becomes moderate).

It is noted that the newly reduced integration control constant Ki is the present Ki multiplied by the ratio of the lower limit value t1 to the actual torque phase time t2 to derive the newly reduced integration constant Ki for the releasing working liquid pressure.

Since the above-described flag ff is reset to "0" at the next step 160, the processing at the step 159 is executed only once.

At a step 161, the CPU thereof corrects the ramp gradient ΔPc which is the rise variation rate of the clutching working liquid pressure as follows:

$\Delta Pc = \Delta Pc \times ts2/t$.

The newly augmented ramp gradient ΔPc of the clutching working liquid pressure multiplied by the ratio of the upper limit value ts2 of the suitable torque phase time to the actual torque phase time t.

According to the learning control B used for the countermeasure against the temporary engine idling described above with reference to FIG. 13, when the engine temporary idling involved in too quick release of the releasing frictional element is developed, the integration control constant Ki is reduced at the steps 156 and 159 provided that the CPU thereof does not determine that the torque phase time is too short so that the reduction variation rate of the releasing working liquid pressure is decremented. Consequently, while the torque phase time is maintained at the suitable (appropriate) value, the engine idling temporary can be prevented from occurring and the gear shift quality can furthermore be improved.

In addition, if the engine temporary idling involved in too quick release of the releasing frictional element is developed and the CPU thereof determines that the torque phase time is too short, the CPU of the controller 9 increments the ramp gradient ΔPc of the clutching working liquid pressure. Hence, while the torque phase time falls in the suitable (appropriate) time range, the temporary engine idling can be prevented from occurring so that the gear shift quality can further be improved.

The reason that such a processing that the ramp gradient ΔPc of the clutching working liquid pressure is incremented is not interposed in the loop including the steps 155, 156, and 157 is that the temporary engine idling which would occur when this loop of steps 155, 156, and 157 is not always due to the ramp gradient ΔPc of the clutching working liquid pressure.

(Fifth Embodiment)

Figure 14:
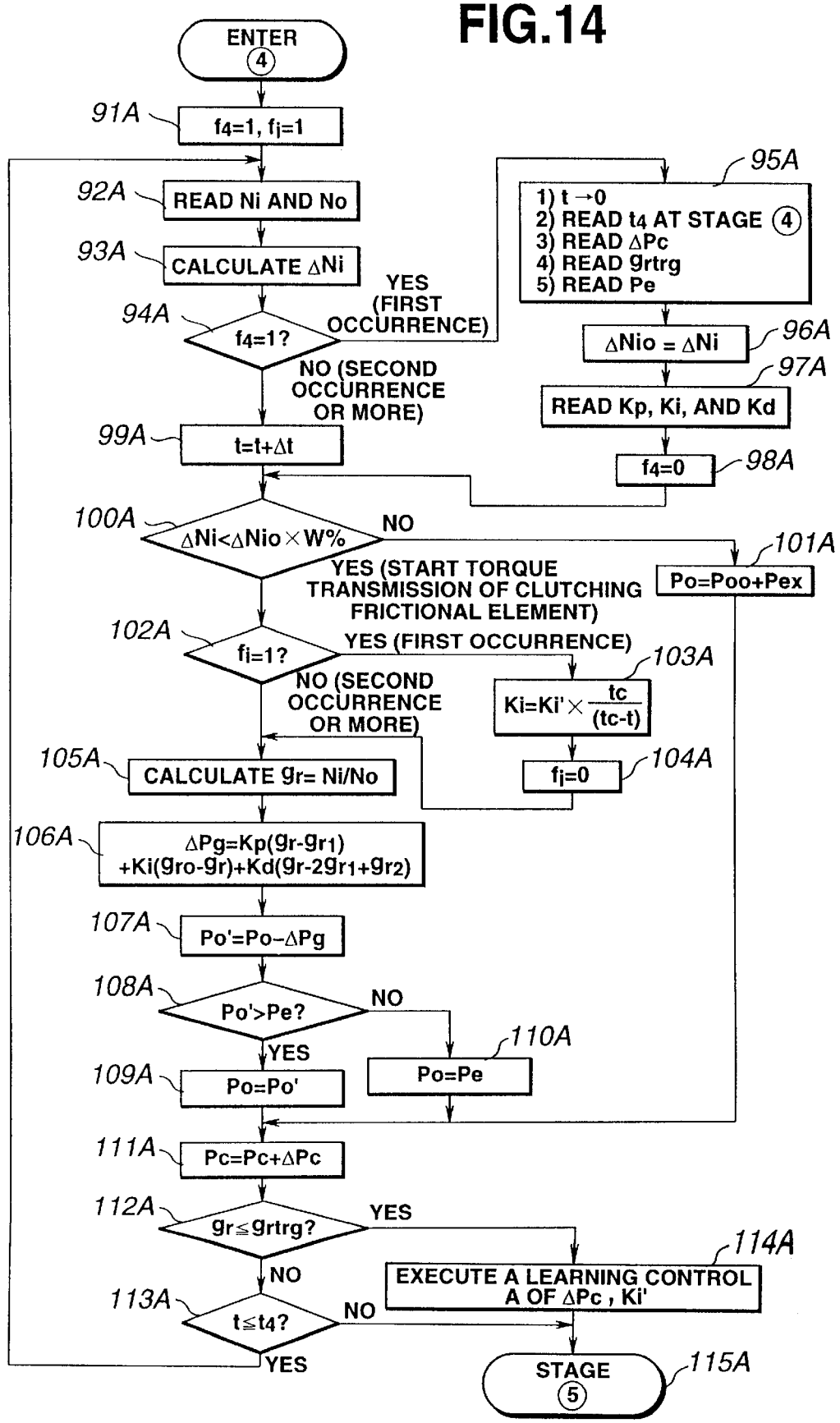
FIG. 14 is a program flowchart indicating a subroutine related to the fourth stage ④ to be executed by the controller in a fifth preferred embodiment according to the present invention.

FIG. 14 shows a fifth preferred embodiment of the gear shift controlling apparatus according to the present invention.

That is to say, FIG. 14 shows the part of the control program flowcharts described in the previous (particularly the first) embodiment and related to the fourth stage ④. The structure and the other program flowcharts described in the first embodiment are generally the same except FIG. 14.

FIGS. 15A, 15B, 15C, and 15D are integrally timing charts of each essential part of the gear shift controlling apparatus as the results of control at the first through fifth stages ① through ⑤.

As shown in FIG. 14, at a step 91A, the CPU of the controller 9 sets the flag f4 to "1" indicating the start of the fourth stage ④ so that the control routine is advanced to steps 95A, 96A, 97A, 98A at a step 94A and, when the control routine reaches a step 102A, an integration control correction flag fi is set to "1" so that steps 103A and 104A are once selected.

It is noted that the loop including the steps 95A through 98A is executed only once since the flag f4 is reset to "0". It is also noted that since the flag fi is reset to "0" at the step 104A, the loop including steps 103A and 104A is executed only once.

At a step 92A, the CPU thereof reads the input axle revolution speed Ni of the automatic transmission 2 and the output axle revolution speed No of the automatic transmission 2.

At a step 93A, the CPU thereof calculates a difference (Ni(nΔt−1)−Ni(nΔt)) between a previously read input axle revolution speed Ni(n−1) and a present read input axle revolution speed Ni(n) to derive a change rate ΔNi of the input axle revolution speed of the automatic transmission 2.

As described above, at the step 95A, from among the steps 95A through 98A which are to be executed only once when the control falls in the fourth stage ④, the CPU thereof resets the timer t to "0" so that the elapsed time upon the start of the fourth stage ④ can be measured and reads the control time duration t4 related to the fourth stage ④.

It is noted that the control time duration t4 related to the fourth stage ④ can be deemed to be the, so-called, fail-safe time duration for the torque phase to be forcefully ended to start the subsequent inertia phase upon the passage of time t4 from the time at which the fourth stage ④ has been started even in a case where the torquue phase to be advanced in the fourth stage ④ cannot be ended due to some cause.

The control time duration t4 is previously set (preset) according to the kind of the gear shift.

Referring back to FIG. 14, at the step 95A, the CPU thereof reads furthermore the ramp gradient ΔPc which is the rise variation rate at the fourth stage ④ on the clutching working liquid pressure command value Pc. The ramp gradient ΔPc is appropriately corrected according to the learning control so that the time duration from the instantaneous time at which the fourth stage ④ shown in FIGS. 15A, 15B, 15C, and 15D has been started to the time up to the torque phase end (inertia phase start) provides the suitable time (appropriate time).

In addition, at the step 95A, the CPU thereof reads the return spring corresponding pressure Pe to give the clutching capacity of the releasing frictional element zero.

At a step 96A, the CPU thereof stores the present input revolution speed variation rate Δni calculated at the step 93A as the initial input revolution speed change rate ΔNio at the start of the fourth stage ④.

At a step 97A, during the torque phase related to the fourth stage ④, the CPU thereof reads the control constants used when the releasing working liquid pressure command value Po is calculated as will be described later, and, in other words, the proportional control constant Kp, a reference value Ki' of the integration control constant (Ki as described later), and the differential control constant Kd, respectively. It is noted that the proportional control constant Kp and the differential control constant Kd are previously fixed values. It is also noted that the reference value Ki' of the integration control constant becomes larger as the working oil temperature T becomes lower as will be described later.

In addition, the CPU thereof calculates the reference value Ki' of the integration control constant Ki so that the clutching capacity of the releasing frictional element indicates zero in the time tc (refer to FIGS. 15A through 15D) which is shorter than the control time duration t4 related to the fourth stage ④.

Furthermore, the CPU thereof appropriately corrects the reference value Ki' of the integration control constant Ki through the learning control so that the time duration from the instantaneous time at which the fourth stage ④ has been started to the instantaneous time at which the torque phase is ended (at which the inertia phase is started) indicates the suitable time duration from the standpoint of a gear shift shock.

Next, at a step 98A, the CPU thereof resets the flag f4 as described above to "0" so that the subsequent processing routine is advanced from the step 94A to the step 99A.

At the step 99A, the CPU thereof increments the timer T by the calculating cycle of Δt so as to measure the elapse time upon the start of the fourth stage ④.

At a step 100A, the CPU thereof determines whether the input revolution variation rate ΔNi at the step 93A is below W (%) (,e.g., 90%) of an initial input revolution change rate ΔNio at the start time of the fourth stage ④ stored at the step 96A, i.e., whether the input revolution speed change rate ΔNi has been reduced by 10% or more with respect to the initial input revolution speed change rate ΔNio so as to determine whether the clutching frictional element has started the torque transmission.

It is noted that the instantaneous time at which the clutching frictional element has started the torque transmission represents the instantaneous time at which the torque phase is to be started in FIGS. 15A, 15B, 15C, and 15D.

At an initial time when the fourth stage ④ has been started and which does not reach the instantaneous time, the CPU thereof maintains the releasing working liquid pressure command value Po at the predetermined pressure (Poo+Pex) which is the value immediately before the occurrence of slip on the releasing frictional element.

On the other hand, at a step 111A, the CPU thereof raises the clutching working liquid pressure command value Pc at the ramp gradient ΔPc at a step 95A.

As the results of maintaining the releasing working liquid pressure command value Po and rise in the clutching working liquid pressure command value Pa, the CPU thereof can determine the torque transmission start of the clutching frictional element from the input revolution speed change rate ΔNi derived at a step 100A.

However, the CPU thereof may alternatively determine the start of torque transmission of the clutching frictional element from an output axle revolution speed change rate (ΔNo) in place of the input axle revolution speed change rate ΔNi.

According to the above-described control routine with reference to FIG. 14, while the torque transmission start of the clutching frictional element is detected from the instantaneous time at which the fourth stage ④ has started, namely, during the clutching response delay of the clutching frictional element, the releasing working liquid pressure command value Po, as shown in FIGS. 15A, 15B, 15C, and 15D, is maintained at the predetermined pressure (Poo+Pex) immediately before the occurrence of slip and the clutching working liquid pressure command value Pc is raised by the ramp gradient ΔPc from the return spring corresponding pressure Pd which is the value immediately before the clutching.

It is, however, noted that the actual start of clutching on the clutching frictional element tends to be retarded with respect to the rise in the clutching working liquid pressure command value Pc. This retardation (delay) corresponds to the time duration from the instantaneous time at which the torque transmission start of the clutching frictional element has detected (the instantaneous time at which the torque phase is to be started).

This time duration means the clutching response delay of the clutching frictional element.

After the torque transmission start of the clutching frictional element has been determined at the step 100A described above, the control routine selects the step 102A in which the CPU thereof determines whether the integration control constant correction flag fi indicates "1". Since the CPU thereof sets the flag fi to "1" at the step 91A, steps of 103A and 104A are executed once. After the routine enters twice or more the program flowchart of FIG. 14, since, at the step 104A, the CPU thereof resets the flag fi to "0". As the result of skipping over the steps 103A and 104A, the steps of 103A and 104A, the steps 103A and 104A are executed only once.

In the way described above at the step 103A which is executed only once when the torque transmission start of the clutching frictional element has been determined, the CPU thereof reads, first, a target time duration tc (refer to FIGS. 15A, 15B, 15C, and 15D) from the instantaneous time at which the fourth stage ④ has been started to an instantaneous time at which the clutching working liquid pressure is reduced to the return spring corresponding pressure Pe at which the clutching capacity of the clutching frictional element indicates zero. The CPU thereof corrects the reference value Ki' of the integration control constant from the target time duration tc, the value of the timer T and an instantaneous time at which the torque phase is to be started) at which the start of the torque transmission of the clutching frictional element has been determined, i.e., the clutching response delay that the clutching frictional element has, and the reference value Ki' of the integration control constant read at the step 97A, using a calculation such that Ki=Ki [tc/(tc−t)] to derive the integration control constant Ki used at the present time.

Thereafter, at the step 106A, the CPU thereof uses the integration control constant Ki derived through the correction at the step 103A from the gear ratio gr, once previous gear ratio gr1, and twice previous gear ratio gr2, and the target gear ratio gr0 set slightly higher than the gear shift prior gear ratio as shown in FIGS. 15A, 15B, 15C, and 15D using the integration control constant Ki derived through the correction at the step 103A. The operating variable ΔPg per calculating cycle of the releasing working liquid pressure command value Po required to maintain the gear ratio gr at the target gear ratio gr0 during the torque phase is determined in the PID calculation method shown in the equation (3).

Since, in the equation (3), gr=gr1=gr2=gear shift prior gear ratio provided that the releasing frictional element is not slipped and, hence, the temporary engine idling does not occur, the equation (3) is substituted into the equation (4).

The operating variable ΔPg per the calculation cycle of the releasing working liquid pressure command value Po is determined as shown by the solid line of FIG. 15D.

As denoted by a gamma γ in FIG. 15D and as described above, the aim of providing the operating variable ΔPg described above is to reduce the releasing working liquid pressure command value Po during the target time duration tc which is shorter than the control time duration t4 related to the fourth stage ④ to the return spring corresponding pressure Pe which provides the second clutching capacity of the releasing frictional element from the predetermined pressure (Poo+Pex) immediately before the occurrence of slip.

That is to say, the aim described above is to derive ΔPg=[(Poo+Pex)−Pe]/tc.

Hence, the equation of (5) is established in the equation (4) described above.

In addition, with the integration control constant Ki derived from the equation (5) and stored as the reference value Ki', the integration control constant Ki is read at the step 97A. Furthermore, at the step 103A, the CPU thereof corrects the reference value Ki' of the integration control constant according to the above-described calculation from the target time duration tc and the clutching response delay t of the clutching frictional element from the instantaneous time at which the fourth stage ④ has started.

As described above, the integration control constant Ki represents the reduction variation rate of the releasing working liquid pressure command value Po.

Hence, the reference value Ki' of the integration control constant Ki represents the reference value of the reduction variation rate of the releasing working liquid pressure command value Po.

Since the reference value of the reduction change rate of the releasing working liquid pressure command value Po is derived from the reference value Ki of the integration constant control using the equation (5), the reference value of the reduction variation rate corresponds to the gradient 7 denoted by FIGS. 15A, 15B, 15C, and 15D.

The reduction variation rate ΔPg of the releasing working liquid pressure command value Po becomes steep, as viewed from the correction equation on the integration control constant Ki at the step 103A as the clutching response delay t of the clutching frictional element with respect to the start of rise in the clutching working liquid pressure command value Pc at the instantaneous time when the fourth stage ④ is started becomes larger.

Consequently, as denoted by a solid line in FIGS. 15A, 15B, 15C, and 15D, at the simultaneous time when the target time duration tc has passed from the time at which the fourth stage ④ has started, the releasing working liquid pressure command value Po can be varied to the return spring corresponding pressure Pe so that the clutching capacity of the releasing frictional element gives zero.

Referring back to FIG. 14, at a step 107A, the CPU thereof derives the new releasing working liquid pressure calculated value Po' from the present releasing working liquid pressure command value Po by the gradient unit of ΔPg calculated at the step 106A so as to derive as: Po'=Po−ΔPg.

At the next step 108A, the CPU thereof determines whether the releasing working liquid calculation value Po' exceeds the return spring corresponding pressure Pe by which the clutching capacity of the releasing frictional element indicates zero.

If PO'>Pe (yes) at the step 108A, the CPU thereof determines that there is no possibility of slip occurred on the releasing frictional element and the routine goes to a step 109A in which the releasing working liquid pressure command value Po is updated to the calculated value Po'.

If below Pe'(Po≦Pe') at a step 108A, especially, if Po<Pe', the CPU thereof determines that there is possibility of the slip occurrence of the releasing frictional element and the routine goes to a step 113A in which Po=Pe, i.e., the releasing working liquid pressure command value Po is set to the return spring corresponding pressure Pe so that the releasing working liquid pressure command value Po is not below Pe.

When the routine goes from either of the step 109A or 173A to a step 111A, the CPU thereof is operated to raise the clutching working liquid pressure Pc by the ramp gradient ΔPc derived at the step 95A.

The results of control over the releasing and clutching working liquid pressures Po and Pc are determined at a step 112A.

In details, the CPU thereof determines whether the gear ratio gr has been reduced up to or below the set gear ratio $g_{rtg}$ read at the step 95A.

The controls over the releasing and clutching working liquid pressures Po and Pc are continued at the instantaneous time when the inertia phase has been started or up to the determination that the timer t has indicated the passage of the torque phase forceful end time duration t4 set for the fail-safe purpose as described above at a step 113A (t>t4).

When the clutching frictional element has started the torque transmission at the instantaneous time when the clutching response delay time of the clutching frictional element has passed from the instantaneous time when the fourth stage ④ has started, in response to the rise of the clutching working liquid pressure command value Pc at the ramp gradient of ΔPc from the time at which the fourth stage ④ has been started, as shown in FIGS. 15A, 15B, 15C, and 15D, the releasing working liquid pressure command value Po has started to reduce from the predetermined pressure (Poo+Pex) immediately before the occurrence of slip, thus the torque phase being started. Thereafter, the releasing working liquid pressure command value Po is reduced under the feedback control mode so that the target gear ratio $g_{r0}$. Thus, together with the clutching working liquid pressure command value Pc, the torque phase is completed by the interchange between the clutching and releasing frictional elements and the insertia phase is started.

It is noted that since the start of the reduction in the releasing working liquid pressure command value Po from the predetermined pressure (Poo+Pex) which provides the releasing frictional element for a state immediately before the occurrence of slip is carried out not at an instantaneous time when the start in rise of the clutching working liquid pressure command value Pc (start of the fourth stage ④ but at the determination of the torque transmission start of the clutching frictional element after the passage of the clutching response delay time of the clutching frictional element from the time at which the fourth stage ④ has started.

The starts of releasing the releasing frictional element and of clutching the clutching frictional element can always be timed. Even if the clutching response delay occurs, the time during which both frictional elements are released is not present any more so that the unfavorable temporary engine idling can be prevented from occurring and the gear shift quality can be improved.

The above-described advantages cannot be ineffective even if the clutching response delay is varied according to a difference in each product of the automatic transmission 2, the aging effect, and environmental change.

In the fifth embodiment, the releasing working liquid pressure command value Po is maintained at the pressure (Poo+Pex) immediately before the occurrence of slip during the clutching response delay time duration from the time at which the fourth stage ④ is started, i.e., from the time at which the clutching working liquid pressure command value Pc is started to raise from the pressure Pd under which the clutching frictional element has in the state immediately before the clutching to the time at which the clutching frictional element has started the torque transmission via the clutching frictional element.

Hence, such an unfavorable situation that the releasing frictional element is not still in the state intermediate before the occurrence of the slip which the clutching frictional element has started the torque transmission can be avoided.

Since Ki=Ki'×tc/(tc−1) at the step 103A, as the clutching response delay time duration from the time at which the fourth stage ④ has started, i.e., from the instantaneous time when the clutching working liquid pressure command value Pc has started to be raised from the pressure Pd under which the clutching frictional element is in such a state as to be immediately before the clutching to the instantaneous time when the torque transmission of the clutching frictional element has started becomes larger, the more steeper the reduction variation rate (Ki) of the releasing working liquid pressure Po immediately after the torque transmission start is made.

Such a situation that in spite of such an instantaneous delay that the releasing working liquid pressure Po is reduced from the pressure (Poo+Pex) corresponding to the state of the releasing frictional element immediately before the occurrence of slip, the gear shift operation time is extended (the gear shift becomes dull) can be avoided.

In a case where the CPU thereof determines at the step 112A that the torque phase has been completed ($g_r \leq g_{rtrg}$), the routine goes to the step 114A in which both the reference value Ki' of the integration control constant Ki and the ramp gradient ΔPc of the clutching working liquid pressure as has been described before with reference to FIG. 8 are under the learning control A and the routine goes to a step 115A to enter the control stage of the fifth stage ⑤.

It is noted that the control contents of the fifth stage ⑤ are not described as described in the case of the first embodiment.

The learning control A is such that the reference value Ki' and the ramp gradient ΔPc of the clutching working liquid pressure are under the learning control A in which the time duration from the time at which the fourth stage ④ has started, i.e., the clutching working liquid pressure command value Pc has started to be raised from the pressure Pd under which the clutching frictional element is in the state immediately before the clutching to the instantaneous time at which the releasing working liquid pressure command value Po is reduced to the return spring corresponding pressure Pe under which the clutching capacity of the releasing frictional element gives zero falls in the suitable range of time. It is also noted that when the CPU thereof determines that the timer t has measured the time duration t4 at the step 113A (t>t4) since the torque phase is not yet ended at the step 112A ($g_r > g_{rtrg}$), the routine goes from the step 112A to the step 115A via the step 113A without passing the step 114A so that the routine enters the fifth stage ⑤ since if the step 114A have passed in this case, the result of learning control A would be inaccurate.

The simple explanation of the fifth stage ⑤ has been made in the first embodiment.

The control stage ⑤ is such that, as shown in FIGS. 15A through 15D, this control is ended at the time when the gear ratio gr has reached to the gear shift after gear ratio (when the gear shift is detected) and the clutching working liquid pressure command value Pc is abruptly raised up to the original pressure value upon the detection of the gear shift end.

As described above, the learning control A at the step 114A is shown in FIG. 8A described in the first embodiment. Hence, the detailed explanation on the learning control A will be omitted herein.

The suitable torque phase time is concerned with the time duration from the instantaneous time at which the fourth stage ④ has been started, i.e., at which the clutching working liquid pressure command value Pc has been started to be raised from the pressure Pd to the instantaneous time at which the torque phase has been ended (the instantaneous time at which the inertia phase has been started), namely, is concerned with the measurement time of the timer t which can be deemed to be approximately the torque phase time.

Figure 8B:
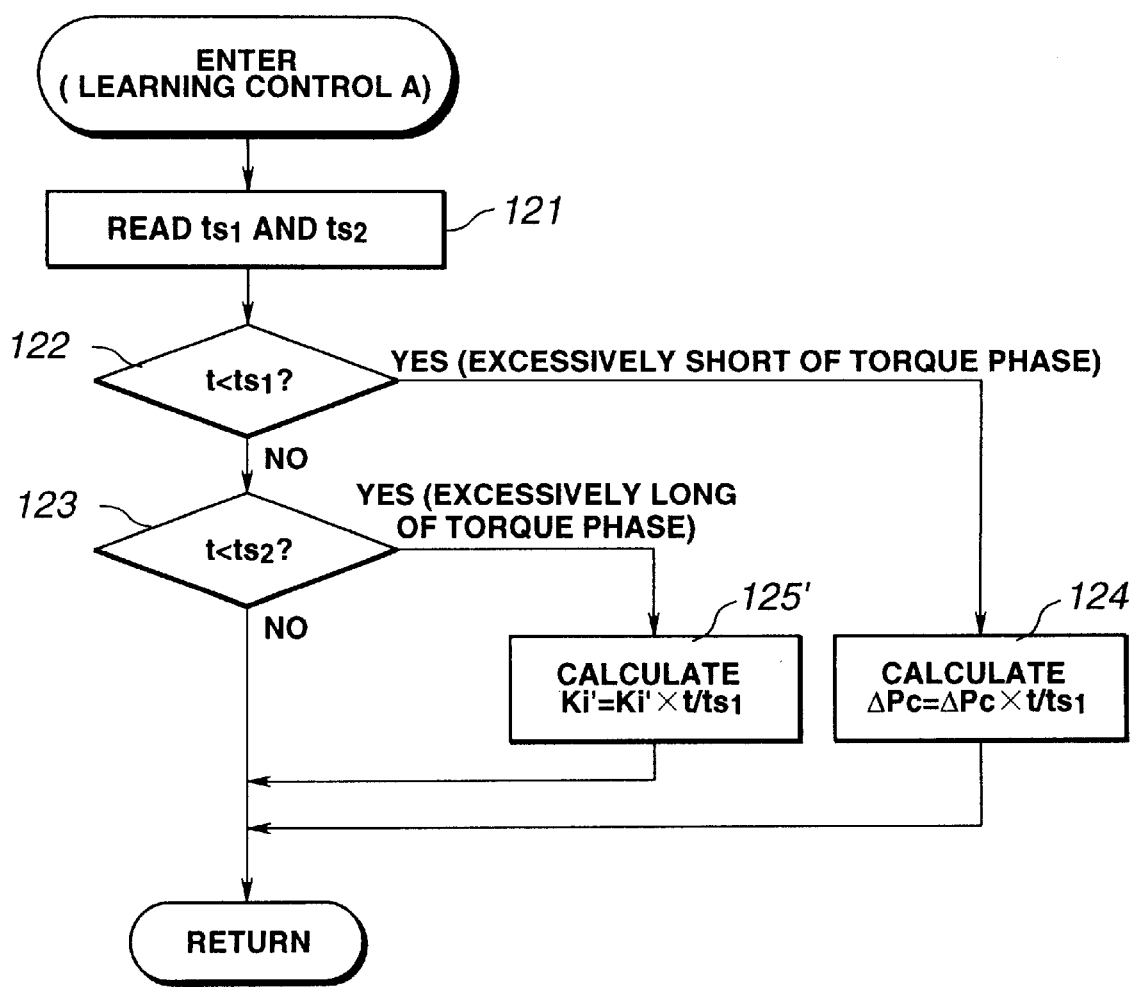
FIG. 8B is a program flowchart indicating the learning control A related to the reduction variation rate of the clutching working liquid pressure to be executed to bring a torque phase time duration into the suitable torque phase time duration value during the gear shift control in a case of a fifth embodiment as will be shown in FIG. 14.

However, since a difference point in the fifth embodiment shown in FIG. 8B from FIG. 8A will be described below.

That is to say, if the torque phase time t is longer than the upper limit ts2 of the suitable torque phase time at the step 123 (yes), the CPU thereof determines that this inconvenience is caused by the releasing delay of the releasing frictional element.

At a step 125', the reference value Ki' of the integration control constant Ki used to determine the reduction variation rate of the integration control constant Ki is corrected to be increased so that the reduction variation rate of the releasing working liquid pressure command value Po becomes steep.

In this incremental correction, Ki'=Ki'×t/ts1 at the step 125', i.e., the newly incremented integration control constant reference value Ki' of the releasing working liquid pressure is the value of the previous reference value Ki' multiplied by the ratio of the actual torque phase time t to the lower limit value ts1 of the suitable torque phase time.

It is of course that if ts1≦t≦ts2, the learning control A is not carried out so that the rise variation rate ΔPc of the clutching working liquid pressure Pc and the reduction variation rate of the releasing working liquid pressure command value Po are maintained as the present values.

According to the learning control A described above, if the torque phase time T is shorter than the lower limit value ts1 (t<ts1), the rise variation rate of the clutching working liquid pressure is reduced with the ramp gradient ΔPc reduced so that the torque phase time T becomes larger. On the contrary, if t>ts2, the reference value Ki' on the releasing working liquid pressure, hence, the integration control constant Ki (as described at the step 125 of FIG. 8A) is augmented so that the reduction variation rate of the releasing working liquid pressure is made steeper, thus the torque phase time t being shortened. Consequently, the torque phase time t can be brought into the suitable (appropriate) range of time between the lower limit value ts1 and the upper limit value ts2 of the suitable torque phase time. As described in the first embodiment, the control hunting can be prevented according to the learning control A. Furthermore, the most practical correction can be made since the ratio between the torque phase time t and the lower limit value ts1 is used when the ramp gradient ΔPc on the clutching working liquid pressure and the reference value Ki' of the integration control constant Ki on the releasing working liquid pressure are corrected through the learning control A.

It is noted that the releasing working liquid pressure command value (Po) and the clutching working liquid pressure command value (Pc) are outputted from the controller 9 to the respective shifting solenoids 6, 7, and 8 according to the kind of the gear shift.

The frictional elements and shifting solenoids are exemplified by the U.S. Pat. No. 5,478.288, the disclosure of which is herein incorporated by reference.

What is claimed is:

1. A vehicular automatic transmission, comprising:
   a) a releasing frictional element;
   b) a clutching frictional element;
   c) a source of a releasing working liquid pressure to be applied to the releasing frictional element and a clutching working liquid pressure to be applied to the clutching frictional element; and
   d) a gear shift controlling apparatus, having a timer for starting a measurement of a time duration from an instantaneous time at which a gear shift instruction is outputted to make a gear shift from the releasing frictional element to the clutching frictional element such that, while the releasing frictional element is released due to a reduction in pressure of the releasing working liquid pressure, the clutching frictional element is clutched due to a rise in pressure of the clutching working liquid pressure to an instantaneous time at which a torque phase is started, for outputting a releasing working liquid pressure command value so that the releasing working liquid pressure is reduced and reached to a first predetermined working liquid pressure value under which the releasing frictional element is in a state immediately before an occurrence of a slip without an overshooting such that the releasing working liquid pressure is reduced below the first predetermined working liquid pressure value so that the slip occurs on the releasing frictional element during the measured time duration and for outputting a clutching working liquid pressure command value so that the clutching working liquid pressure becomes at least a second predetermined working liquid pressure value under which the clutching element is in a state immediately before a clutching upon an end of an elapse of the time duration.

2. A vehicular automatic transmission as claimed in claim 1, wherein the timer starts the measurement of a subsequent elapse of time in the torque phase and the gear shift controlling apparatus comprises: a detector for detecting a revolution speed of an input axle of the automatic transmission; a first determinator for determining a variation rate of the revolution speed of the input axle of the automatic transmission; and a second determinator for determining whether the clutching frictional element has started on the basis of the determined variation rate of the revolution speed of the automatic transmission and wherein the gear shift controlling apparatus outputs the releasing working liquid pressure command value so that the releasing working liquid pressure is started to be reduced below the first predetermined working liquid pressure value when determining that the clutching frictional element has started the torque transmission.

3. An apparatus for controlling a gear shift of a vehicular automatic transmission associated with an engine, the automatic transmission having a releasing frictional element, a clutching frictional element, and a source of a releasing working liquid pressure to be applied to the releasing frictional element and a clutching working liquid pressure to be applied to the clutching frictional element, a gear shift in the automatic transmission being carried out by a shift from the releasing frictional element to the clutching frictional element such that while the releasing frictional element is released due to a reduction in pressure of the releasing working liquid pressure, the clutching frictional element is clutched due to a rise in pressure of the clutching working liquid pressure, the gear shift controlling apparatus comprising:
   a) an engine driving condition detector for detecting an engine operating condition, the engine driving condition detector having an engine revolution speed sensor for detecting an engine revolution speed;
   b) an automatic transmission input axle revolution speed sensor for detecting a revolution speed of an input axle of the automatic transmission;
   c) an automatic transmission output axle revolution speed sensor for detecting a revolution speed of an output axle of the automatic transmission; and
   d) a controller for determining a suitable gear shift range on the basis of the engine operating condition and the automatic transmission output axle revolution speed, for comparing the suitable gear shift range with a presently selected gear shift range, for outputting a gear shift instruction to the automatic transmission to carry out the gear shift when the suitable gear shift range is incongruent with the presently selected gear shift range, for determining an input torque of the automatic transmission on the basis of the revolution speeds of the input and output axles of the automatic transmission, for determining a first predetermined releasing working liquid pressure value under which the releasing frictional element is in a state immediately before an occurrence of a slip thereon on the basis of the input torque of the automatic transmission, for determining and outputting a rate of the reduction in pressure of a releasing working liquid pressure command value to the automatic transmission so that the releasing working liquid pressure is reduced and reached to the first predetermined releasing working liquid pressure value without an undershooting such that the releasing working liquid pressure is reduced below the first predetermined releasing working liquid pressure value so that the slip occurs on the releasing frictional element during a time duration from an instantaneous time at which the gear shift instruction is outputted to an instantaneous time at which a torque phase is started, and for determining and outputting a clutching working liquid pressure command value to the automatic transmission so that the clutching working liquid pressure becomes at least a second predetermined clutching working liquid pressure value under which the clutching frictional element is in a state immediately before a clutching upon an end of an elapse of the time duration.

4. An apparatus for controlling a gear shift of a vehicular automatic transmission associated with an engine as claimed in claim 3, which further comprises a working liquid temperature sensor for detecting a working liquid temperature (T) in the automatic transmission and wherein the controller previously derives the time duration (t1+t2+t3) on the basis of the working liquid temperature (T), the time duration being divided into a first control time duration (t1), a second control time duration (t2), and a third control time duration (t3), the first control time duration (t1) being a time required for the clutching frictional element to complete its stroke loss under a pre-charge command pressure (Pa) and being predetermined according to the working liquid temperature (T), the second control time duration (t2) being a predetermined margin time to be added to the first control time duration (t1), and the third control time duration (t3) being a predetermined time duration required for the clutching frictional element to be assured to complete its stroke loss even if an actual rise in the clutching working liquid pressure (Pc) applied to the clutching frictional element due to the pre-charge command pressure (Pa) is most retarded.

5. An apparatus for controlling a gear shift of a vehicular automatic transmission associated with an engine as claimed in claim 4, wherein the controller determines the first predetermined releasing working liquid pressure value (Poo+Pex) on the basis of the input torque of the automatic transmission as follows: the controller first determines a minimum working liquid pressure (Poo) required for the releasing frictional element to be clutched as follows:

Poo=Pe+(Ti/2N×$\mu$×R×A), wherein Pe denotes a return spring corresponding working liquid pressure, Ti denotes a charging torque that the releasing frictional element charges, N denotes a number of clutch plates of the releasing working liquid pressure, $\mu$ denotes a frictional coefficient of each clutch plate thereof, R denotes an effective radius of each clutch plate, A denotes a piston pressure receiving area, and the controller adds a margin pressure (Pex) used for avoiding the occurrence of the slip on the releasing frictional element to the minimum pressure (Poo) to determine the first predetermined releasing working liquid pressure value (Poo+Pex).

6. An apparatus for controlling a gear shift of a vehicular automatic transmission associated with an engine as claimed in claim 5, wherein the controller determines a first rate of reduction ($\Delta$P1) in pressure of the releasing working liquid pressure command value (Po) of the releasing working liquid pressure which is a sum of the first predetermined releasing working liquid pressure value (Poo+Pex) and a predetermined working liquid pressure ($\alpha$) corresponding to a moderate reduction in pressure for preventing the undershooting when the time duration has passed (t1+t2+t3).

7. An apparatus for controlling a gear shift of a vehicular automatic transmission associated with an engine as claimed in claim 6, wherein the controller determines whether a presently reducing releasing working liquid pressure command value (Po'=Po−$\Delta$P1) is below the first predetermined releasing working liquid pressure value (Poo+Pex) during the first control time duration and the subsequent second control time duration (ta=t1+t2), the controller updates the presently reducing releasing working liquid pressure command value to a newly reducing releasing working liquid pressure command value (Po'=Po−$\Delta$P1) when Po'>(Poo+Pex), and the controller sets the releasing working liquid pressure command value (Po) to the first predetermined releasing working liquid pressure value (Po=Poo+Pex) when Po'<(Poo+Pex).

8. An apparatus for controlling a gear shift of a vehicular automatic transmission associated with an engine as claimed in claim 7, which further comprises a timer (t) which measures an elapse time from the instantaneous time at which the gear shift instruction is outputted and wherein the controller reduces the releasing working liquid pressure command value (Po) to the first predetermined releasing working liquid pressure value (Poo+Pex) until the timer (t) indicates the passage of the time duration (t1+t2+t3).

9. An apparatus for controlling a gear shift of a vehicular automatic transmission associated with an engine as claimed in claim 8, wherein the controller sets once the clutching working liquid pressure command value (Pc) to the pre-charge pressure value (Pb) until the timer (t) indicates the fist control time duration (t1) and sets the clutching working liquid pressure command value (Pc) to the second predetermined clutching working liquid pressure value (Pd) until the timer (t) thereafter indicates the passage of the subsequent second control time duration (t2).

10. An apparatus for controlling a gear shift of a vehicular automatic transmission associated with an engine as claimed in claim 9, wherein the predetermined margin pressure (Pex) is varied according to the minimum pressure (Poo) required for the releasing frictional element to the clutched.

11. An apparatus for controlling a gear shift of a vehicular automatic transmission associated with an engine as claimed in claim 10, wherein the controller derives a charge torque (Ti) of the releasing frictional element as follows: Ti=Tt×i, wherein Tt denotes the input torque of the automatic transmission and i denotes a torque charge rate of the releasing frictional element.

12. An apparatus for controlling a gear shift of a vehicular automatic transmission associated with an engine as claimed in claim 10, wherein the engine driving condition detector comprises a throttle valve opening angle sensor for detecting an opening angle (TVO) of an engine throttle valve and wherein the controller determines a vehicle speed (VSP) from the revolution speed (No) of the output axle of the automatic transmission and determines the suitable gear shift range according to the opening angle of the engine throttle valve (TVO) and the vehicle speed (VSP).

13. An apparatus for controlling a gear shift of a vehicular automatic transmission associated with an engine as claimed in claim 12, wherein the controller determines the input torque of the automatic transmission as follows: Tt=t×τ×Ne², wherein t denotes a torque ratio of a torque converter of the automatic transmission, τ denotes a torque capacity coefficient of the torque converter, and Ne denotes the revolution speed of the engine, both t and τ thereof being derived according to a speed ratio e wherein e=Ni/No, wherein Ni denotes the revolution speed of the input axle of the automatic transmission and No denotes the revolution speed of the automatic transmission.

14. An apparatus for controlling a gear shift of a vehicular automatic transmission associated with an engine as claimed in claim 10, wherein, while the timer (t) measures the elapse of the third control time duration (t3) from the instantaneous time at which the second control time duration (t2) is ended, the controller calculates an effective gear ratio ($g_r$) as follows: $g_r$=Ni/No, determines whether the calculated effective gear ratio $g_r$ is below a temporary engine idling determining gear ratio ($g_{rovr}$), and raises the margin pressure (Pex) by a predetermined value (ΔPinc) (Pex=Pex+ΔPinc) so that the first predetermined releasing working liquid pressure (Poo+Pex) at the instantaneous time at which the torque phase is started is raised when $g_r \geq g_{rovr}$.

15. An apparatus for controlling a gear shift of a vehicular automatic transmission associated with an engine as claimed in claim 14, wherein the controller sets the releasing working liquid pressure command value (Po) to the first predetermined releasing working liquid pressure value (Poo+Pex) after the controller raises the margin pressure (Pex) by the predetermined value (Δpinc) (Pex Pex+Δpinc).

16. An apparatus for controlling a gear shift of a vehicular automatic transmission associated with an engine as claimed in claim 14, wherein the controller forcefully ends the measurement of the third control time duration (t3) to start the measurement of the fourth control time duration (t4) corresponding to the torque phase when the margin pressure (Pex) is raised by the fourth rate (Δ Pinc) as Pex=Pex+Δpinc.

17. An apparatus for controlling a gear shift of a vehicular automatic transmission associated with an engine as claimed in claim 16, wherein, when $g_r<g_{rovr}$ and when the measure time duration (t) of the timer is above the third control time duration (t3) (t<t3), the margin pressure (Pex) is reduced by a fifth rate (ΔPdec) of reduction in pressure as follows: Pex=Pex−ΔPdec.

18. An apparatus for controlling a gear shift of a vehicular automatic transmission associated with an engine as claimed in claim 17, wherein a value of the fourth rate (Δpinc) is larger than that of the fifth rate (ΔPdec).

19. An apparatus for controlling a gear shift of a vehicular automatic transmission associated with an engine as claimed in claim 8, wherein the timer (t) measures the elapse of the third time duration (t3) from the instantaneous time at which the second control time duration (t2) is ended and, when the timer (t) has started to measure the elapse of the third control time duration (t3), the controller calculates the minimum working liquid pressure (Poo) for the releasing frictional element to be clutched on the basis of the presently calculated input torque (Tt) of the automatic transmission, calculates a second rate (ΔP2) of the reduction in pressure of the releasing working liquid pressure command value (Po= Poo+Pex+α) at the instantaneous time at which the third control time duration (t3) is started to the instantaneous time at which the third time duration (t3) is ended.

20. An apparatus for controlling a gear shift of a vehicular automatic transmission associated with an engine as claimed in claim 19, wherein the controller determines a newly calculated releasing working liquid pressure command value (Po') as follows: Po'=Po−ΔP2, determines whether the newly calculated releasing working liquid pressure command value (Po') is below the first predetermined releasing working liquid pressure value (Poo+Pex), updates the newly calculated releasing working liquid pressure command value to the releasing working liquid pressure command value (Po'= Po) when Po'>(Poo+Pex), and sets the releasing working liquid pressure command value (Po) to the first predetermined working liquid pressure value (Po'=Poo+Pex) when Po'<(Poo+Pex).

21. An apparatus for controlling a gear shift of a vehicular automatic transmission associated with an engine as claimed in claim 20, wherein the timer (t) starts to measure a fourth time duration (t4) at an instantaneous time at which the third control time duration (t3) is ended and the torque phase is started and wherein the controller reads a third rate (ΔPc) of a rise in pressure of the clutching working liquid pressure command value (Pc), reads a set gear ratio ($g_{rtrg}$) used to determine an end of the torque phase, and reads the return spring corresponding pressure (Pe) for the releasing frictional element so that a clutching capacity of the releasing frictional element gives zero when the return spring corresponding pressure (Pe) is supplied.

22. An apparatus for controlling a gear shift of a vehicular automatic transmission associated with an engine as claimed in claim 21, wherein the controller reads a fixed proportional control constant (Kp), a fixed differential control constant (Ki), and a variable integration control constant (Kd), the proportional, differential, and integration control constants (Kp, Ki, and Kd) being used to perform a feedback control over the releasing working liquid pressure command value (Po) during the fourth control time duration (t4).

23. An apparatus for controlling a gear shift of a vehicular automatic transmission associated with an engine as claimed in claim 22, wherein, while the timer (t) measures the elapse of the fourth time duration (t4), the controller reads the revolution speeds (Ni and No) of the input axle and the output axle of the automatic transmission, calculates an effective gear ratio ($g_r$) from the read revolution speeds of the input and output axles of the automatic transmission as follows: $g_r$=Ni/No, and calculates an operating variable (ΔPg) per a calculating cycle of the releasing working liquid pressure command value (Po) required for the effective gear ratio ($g_r$) to be maintained at a target gear ratio ($g_{r0}$) during the torque phase of the fourth control time duration (t4) as follows: $\Delta Pg=Kp(g-g_{r1})+Ki\ (g_{r0}-g_r)+Kd\ (g_r-2g_{r1}+g_{r2})$, wherein $g_{r1}$ denotes once previous effective gear ratio and $g_{r2}$ denotes twice previous effective gear ratio.

24. An apparatus for controlling a gear shift of a vehicular automatic transmission associated with an engine as claimed in claim 23, wherein the fourth control time duration (t4) is predetermined according to a kind of the gear shift and is a time duration for such a fail-safe purpose that the torque phase is forcefully ended to start an inertia phase when the fourth time duration (t4) is passed from the instantaneous time at which the fourth control time duration (t4) is started.

25. An apparatus for controlling a gear shift of a vehicular automatic transmission associated with an engine as claimed in claim 24, wherein the controller calculates the integration control constant (Ki) as follows: Ki=[(Poo+Pex)−Pe]/[tc ($g_{r0}-g_r$)], wherein tc denotes a suitable torque phase time duration which is shorter than the fourth control time duration (t4).

26. An apparatus for controlling a gear shift of a vehicular automatic transmission associated with an engine as claimed in claim 25, wherein the controller calculates a newly calculated releasing working liquid pressure command value (Po') as follows: Po'=Po−ΔPg, determines whether the newly calculated releasing working liquid pressure command value (Po') is below the return spring corresponding working liquid pressure value (Pe), and updates the newly calculated releasing working liquid pressure command value (Po') to the releasing working liquid pressure command value (Po= Po') when Po'>Pe and sets the releasing working liquid pressure command value to the return spring corresponding working liquid pressure Pe (Po=Pe) when Po'<Pe.

27. An apparatus for controlling a gear shift of a vehicular automatic transmission associated with an engine as claimed in claim 26, wherein the controller raises the clutching working liquid pressure command value (Pc) by the third rate (ΔPc) until the timer (t) indicates the elapse of the fourth control time duration (t4).

28. An apparatus for controlling a gear shift of a vehicular automatic transmission associated with an engine as claimed in claim 27, wherein the controller determines whether the effective gear ratio ($g_r$) is equal to or below the set gear ratio ($g_{rtrg}$) ($g_r \leq g_{rtrg}$) and the control forcefully ends the torque phase when $g_r \leq g_{rtrg}$.

29. An apparatus for controlling a gear shift of a vehicular automatic transmission associated with an engine as claimed in claim 28, wherein the integration control constant (Ki) becomes shorter as the working liquid temperature (T) becomes lower.

30. An apparatus for controlling a gear shift of a vehicular automatic transmission associated with an engine as claimed in claim 29, wherein the controller reads the value of the timer (t) when the effective gear ratio ($g_r$) is equal to or below the set gear ratio ($g_{rtrg}$) ($g_r \leq g_{rtrg}$) and wherein the controller reads a lower limit value (ts1) of the suitable torque phase time (tc) and an upper limit value (ts2) thereof, when $g_r \leq g_{rtrg}$, determines whether the measured time duration (t) of the timer is shorter than the lower limit value (ts1) of the suitable torque phase time duration(tc) and, when t≧ts1, determines whether the measure time (t) is longer than the upper limit value (ts2) of the suitable torque phase time duration(tc).

31. An apparatus for controlling a gear shift of a vehicular automatic transmission associated with an engine as claimed in claim 30, wherein the controller corrects the third rate (ΔPc) of the rise in pressure of the clutching working liquid pressure command value as follows: ΔPc=ΔPc×t/ts1 when t<ts1 and the controller corrects the integration control constant as follows: Ki=Ki×t/ts1 when t>ts2.

32. An apparatus for controlling a gear shift of a vehicular automatic transmission associated with an engine as claimed in claim 31, wherein the set gear ratio $g_{rtrg}$ is set to a gear ratio which is slightly offset from a gear shift prior gear ratio toward a gear shift after gear ratio and is predetermined according to the kind of the gear shift.

33. An apparatus for controlling a gear shift of a vehicular automatic transmission associated with an engine as claimed in claim 32, wherein the timer (t) measures the time duration of a fifth control time duration (t5) corresponding to an inertia phase at an instantaneous time at which the timer (t) indicates the elapse of the fourth time duration (t4) and wherein the controller sets the releasing working liquid pressure command value (Po) to zero and raises the clutching working liquid pressure command value (Pc) by a fourth rate (ΔPd) of the rise in pressure of the clutching working liquid pressure command value (Pc) so that the effective gear ratio (gr) is varied to the gear shift after gear ratio during the inertia phase, the fourth rate (ΔPd) being smaller than the third rate (ΔPc), and raises the clutching working liquid pressure command value (Pc) to an original pressure command value thereof before the gear shift instruction is outputted when the effective gear ratio ($g_r$) has reached to the gear shift after gear ratio.

34. An apparatus for controlling a gear shift of a vehicular automatic transmission associated with an engine as claimed in claim 33, wherein the upper limit (ts2) value of the suitable torque phase time (tc) is approximately 0.15 seconds and the lower limit value (ts1) thereof is approximately 0.10 seconds.

35. An apparatus for controlling a gear shift of a vehicular automatic transmission associated with an engine as claimed in claim 32, wherein, when the timer (t) measures the fourth control time duration (t4) from the instantaneous time at which the fourth control time duration (t4) is started, the controller calculates an effective gear ratio ($g_r$) as follows: gr=Ni/No, determines whether the calculated effective gear ratio $g_r$ is below a temporary engine idling determining gear ratio ($g_{rovr}$) and wherein, when $g_r \geq g_{rovr}$ the controller reads a lower limit value (ts1) of the suitable torque phase time (tc) and an upper limit value (ts2) thereof, determines whether the measured time duration of the timer (t) is shorter than the lower limit value (ts1), and determines whether the measured time duration of the timer (t) is longer than the upper limit value (ts2) when t≧ts1.

36. An apparatus for controlling a gear shift of a vehicular automatic transmission associated with an engine as claimed in claim 35, wherein when t<ts1, the controller corrects the third rate (ΔPc) of the rise in pressure of the clutching working liquid pressure command value (Pc) as follows: ΔPc=ΔPc×ts1/t, when t>ts2, the controller corrects the integration control constant (Ki) for the releasing working liquid pressure command value (Po) as follows: Ki=Ki×ts1/t, and when ts2≧t≧ts1, the controller corrects the integration control constant (Ki) as follows: Ki=Ki×ts1/t; and corrects the third rate (ΔPc) of the rise in pressure of the clutching working liquid pressure command value (Pc) as follows: ΔPc=Δ Pc×ts2/t.

37. An apparatus for controlling a gear shift of a vehicular automatic transmission associated with an engine as claimed in claim 36, wherein the controller determines whether the clutching frictional element has started a torque transmission during the torque phase on the basis of the variation rate (ΔNi) of the input axle of the automatic transmission and operates to reduce the releasing working liquid pressure at the instantaneous time at which the torque phase is started (Po=Poo+Pex) to the return spring corresponding pressure value (Pe) when determining that the clutching frictional element has started the torque transmission.

38. An apparatus for controlling a gear shift of a vehicular automatic transmission associated with an engine as claimed in claim 37, wherein the controller determines whether the clutching frictional element has started the torque transmission using the following inequality: ΔNi<ΔNiO×W (%), wherein ΔNiO denotes an initial variation rate of the revolution speed of the input axle of the automatic transmission at the instantaneous time at which the fourth control time duration is started, ΔNi denotes a presently calculated variation rate of the revolution speed of the input axle of the automatic transmission, N denotes a predetermined numerical value above zero.

39. An apparatus for controlling a gear shift of a vehicular automatic transmission associated with an engine as claimed in claim 37, wherein the controller maintains the releasing working liquid pressure command value (Po) at the first predetermined releasing working liquid pressure value (Po= Poo+Pex) when determining that the clutching element has not yet started the torque transmission.

40. An apparatus for controlling a gear shift of a vehicular automatic transmission associated with an engine as claimed in claim 39, wherein the controller corrects the integration control constant (Ki) when determining that the clutching element has started the torque transmission as follows: Ki=Ki'×tc/(tc−t), wherein tc denotes a suitable torque phase time duration and t denotes the measurement time of the timer (t) from the instantaneous time at which the torque phase is started.

41. An apparatus for controlling a gear shift of a vehicular automatic transmission associated with an engine as claimed in claim 40, wherein the controller calculates an effective gear ratio ($g_r$) when determining that the clutching element has started the torque transmission as follows: $g_r$=Ni/No, the controller calculates a feedback operating variable (ΔPg) for the releasing working liquid pressure command value (Po) as follows: $\Delta Pg = Kp(g_r-g_{r1})+Ki(g_{r0}-g_r)+Kd(g_r-2g_{r1}+g_{r2})$, wherein $g_{r1}$ denotes one previous effective gear ratio, $g_{r2}$ denotes twice previous effective gear ratio, $g_{r0}$ denotes a target effective gear ratio, and the controller calculates a newly calculated releasing working liquid pressure command value (Po) as follows: (Po'=Po−ΔPg).

42. An apparatus for controlling a gear shift of a vehicular automatic transmission associated with an engine as claimed in claim 41, wherein the controller determines whether Po'>Pe and the controller updates the newly calculated working liquid pressure command value to the releasing working liquid pressure command value (Po =Po') when Po'>Pe and sets the releasing working liquid pressure command value to the return spring corresponding working liquid pressure value (Po=Pe) when Po'<Pe.

43. An apparatus for controlling a gear shift of a vehicular automatic transmission associated with an engine as claimed in claim 42, wherein the controller raises the clutching working liquid pressure command value by the third rate (ΔPc) (Pc=Pc+ΔPc) when determining that the clutching element has started the torque transmission.

44. An apparatus for controlling a gear shift of a vehicular automatic transmission associated with an engine as claimed in claim 43, wherein the controller determines whether the effective gear ratio ($g_r$) is equal to or below the set gear ratio ($g_{rtrg}$) ($g_r \leq g_{rtrg}$) and carries out a learning control of the third rate (ΔPc) of the rise in pressure of the clutching working liquid pressure command value (Pc) and of the reference value (Ki') of the integration control constant (Ki).

45. An apparatus for controlling a gear shift of a vehicular automatic transmission associated with an engine as claimed in claim 44, wherein the controller, when determining that $g_r \leq g_{rtrg}$, reads a lower limit value (ts1) of the suitable torque phase time (tc) and an upper limit value (ts2) thereof, determines whether the measured time duration of the timer (t) is shorter than the lower limit value (ts1) (t<ts1), determines whether the measured time duration of the timer (t) is longer than the upper limit value (ts2) (t>ts2) when t≧ts1, corrects ΔPc as follows: ΔPc=ΔPc+t/ts1 when determining that t<ts1, and corrects the reference value (Ki') of the integration control constant (Ki) as follows: Ki'=Ki'×t/ts1 when determining that t>ts2.

46. An apparatus for controlling a gear shift of a vehicular automatic transmission associated with an engine as claimed in claim 21, wherein the controller reads the revolution speeds of the input and output axles of the automatic transmission, calculates a variation rate (Δ Ni) of the revolution speed of the input axle of the automatic transmission, stores an initial variation rate (ΔNiO) of the input axle of the automatic transmission at an instantaneous time at which the torque phase corresponding to the fourth control time duration (t4) is started, and reads a fixed proportional control constant (Kp), a variable reference value (Ki') of an integration control constant (Ki), and a fixed differential control constant (Kd), the proportional, differential, and integration control constants being used to perform a feedback control over the releasing working liquid pressure.

47. An apparatus for controlling a gear shift of a vehicular automatic transmission associated with an engine as claimed in claim 19, wherein the controller maintains the clutching working liquid pressure command value (Pc) at the return spring corresponding pressure value (Pd) until the timer (t) indicates the elapse of the third control time duration (t3) so that the clutching frictional element is maintained at a state wherein its stroke loss is completed.

48. An apparatus for controlling a gear shift of a vehicular automatic transmission associated with an engine, the automatic transmission having a releasing frictional element, a clutching frictional element, and a source of a releasing working liquid pressure to be applied to the releasing frictional element and a clutching working liquid pressure to be applied to the clutching frictional element, a gear shift in the automatic transmission being carried out by a shift from the releasing frictional element to the clutching frictional element such that while the releasing frictional element is released due to a reduction in pressure of the releasing working liquid pressure, the clutching frictional element is clutched due to a rise in pressure of the clutching working liquid pressure, the gear shift controlling apparatus comprising:

a) engine driving condition detecting means for detecting an engine operating condition, the engine driving condition detecting means including engine revolution speed sensing means for detecting an engine revolution speed;

b) automatic transmission input axle revolution speed detecting means for detecting a revolution speed of an input axle of the automatic transmission;

c) automatic transmission output axle revolution speed detecting means for detecting a revolution speed of an output axle of the automatic transmission;

d) first determining means for determining a suitable gear shift range on the basis of the engine operating condition and the automatic transmission output axle revolution speed;

e) comparing means for comparing the suitable gear shift range with a presently selected gear shift range;

f) first outputting means for outputting a gear shift instruction to the automatic transmission to carry out the gear shift when the suitable gear shift range is incongruent with the presently selected gear shift range;

g) second determining means for determining an input torque of the automatic transmission on the basis of the revolution speeds of the input and output axles of the automatic transmission;

h) third determining means for determining a first predetermined releasing working liquid pressure value under which the releasing frictional element is in a state immediately before an occurrence of a slip thereon on the basis of the input torque of the automatic transmission;

i) fourth determining means for determining a rate of the reduction in pressure of a releasing working liquid pressure command value to the automatic transmission so that the releasing working liquid pressure is reduced and reached to the first predetermined releasing working liquid pressure value without an undershooting such that the releasing working liquid pressure is reduced below the first predetermined releasing working liquid pressure value so that the slip occurs on the releasing frictional element during a time duration from an instantaneous time at which the gear shift instruction is outputted to an instantaneous time at which a torque phase is started;

j) fifth determining means for determining a clutching working liquid pressure command value to the clutching working liquid pressure so that the clutching working liquid pressure becomes at least a second predetermined clutching working liquid pressure value under which the clutching frictional element is in a state immediately before a clutching upon an end of an elapse of the time duration; and k) second outputting means for outputting the releasing working liquid pressure command value (Po) to the automatic transmission and outputting the clutching working liquid pressure command value (Pc) to the automatic transmission.

49. A method for controlling a gear shift of a vehicular automatic transmission associated with an engine, the automatic transmission having a releasing frictional element, a clutching frictional element, and a source of a releasing working liquid pressure to be applied to the releasing frictional element and a clutching working liquid pressure to be applied to the clutching frictional element, a gear shift in the automatic transmission being carried out by a shift from the releasing frictional element to the clutching frictional element such that while the releasing frictional element is released due to a reduction in pressure of the releasing working liquid pressure, the clutching frictional element is clutched due to a rise in pressure of the clutching working liquid pressure, the gear shift controlling method comprising the steps of:

a) detecting an engine operating condition, the engine driving condition including detecting an engine revolution speed;

b) detecting a revolution speed of an input axle of the automatic transmission;

c) detecting a revolution speed of an output axle of the automatic transmission;

d) determining a suitable gear shift range on the basis of the engine operating condition and the automatic transmission output axle revolution speed;

e) comparing the suitable gear shift range with a presently selected gear shift range;

f) outputting a gear shift instruction to the automatic transmission to carry out the gear shift when the suitable gear shift range is incongruent with the presently selected gear shift range;

g) determining an input torque of the automatic transmission on the basis of the revolution speeds of the input and output axles of the automatic transmission;

h) determining a first predetermined releasing working liquid pressure value under which the releasing frictional element is in a state immediately before an occurrence of a slip thereon on the basis of the input torque of the automatic transmission;

i) determining a rate of the reduction in pressure of a releasing working liquid pressure command value to the automatic transmission so that the releasing working liquid pressure is reduced and reached to the first predetermined releasing working liquid pressure value without an undershooting such that the releasing working liquid pressure is reduced below the first predetermined releasing working liquid pressure value so that the slip occurs on the releasing frictional element during a time duration from an instantaneous time at which the gear shift instruction is outputted to an instantaneous time at which a torque phase is started;

j) determining a clutching working liquid pressure command value to the automatic transmission so that the clutching working liquid pressure becomes at least a second predetermined clutching working liquid pressure value under which the clutching frictional element is in a state immediately before a clutching upon an end of an elapse of the time duration;

k) outputting the releasing working liquid pressure command value to the automatic transmission; and l) outputting the clutching working liquid pressure command value to the automatic transmission.

* * * * *